United States Patent [19]

Shepard et al.

[11] 3,785,031
[45] Jan. 15, 1974

[54] NONSYNCHRONOUS CONVEYOR SYSTEM

[75] Inventors: Lyman K. Shepard, Upper Saddle River; Zoltan E. Zilahy, Nutley, both of N.J.

[73] Assignee: Standard Tool & Manufacturing Co., Lyndhurst, N.J.

[22] Filed: July 19, 1972

[21] Appl. No.: 273,321

[52] U.S. Cl. ............................................. 29/200 A
[51] Int. Cl. ............................................ B23p 19/00
[58] Field of Search .................. 29/200 A, 200 R, 29/200 P, 200 B; 198/19

[56] References Cited
UNITED STATES PATENTS
R25,886  10/1965  Cargill ............................ 29/200 A
3,646,656  3/1972  Zilahy ............................. 29/200 A Primary Examiner—Thomas H. Eager
Attorney—J. King Harness et al.

[57] ABSTRACT

The machine has vertical tracks forming one or more continuous loops with or without transfer mechanism therebetween which permits sub-assemblies on fixture mounted pallets on carriers of one loop to be progressively worked upon at stations and transferred to sub-assemblies on pallets of carriers on one or more other loops to continue the assembly operations until the product is completed. The carriers are stopped in a collecting area ahead of the stations and are positively advanced out of and into the stations where the pallet is accurately located and clamped. The work performed at the station is checked to make certain a correct operation was performed and if an indicating flag shows that it was not, the carrier is passed through the stations thereahead. If the station is defective and continues to perform its operation badly, a carrier stop mechanism may be attached to the track ahead of the station to have the operation performed on the workpiece manually until the defect in the station has been corrected.

28 Claims, 33 Drawing Figures

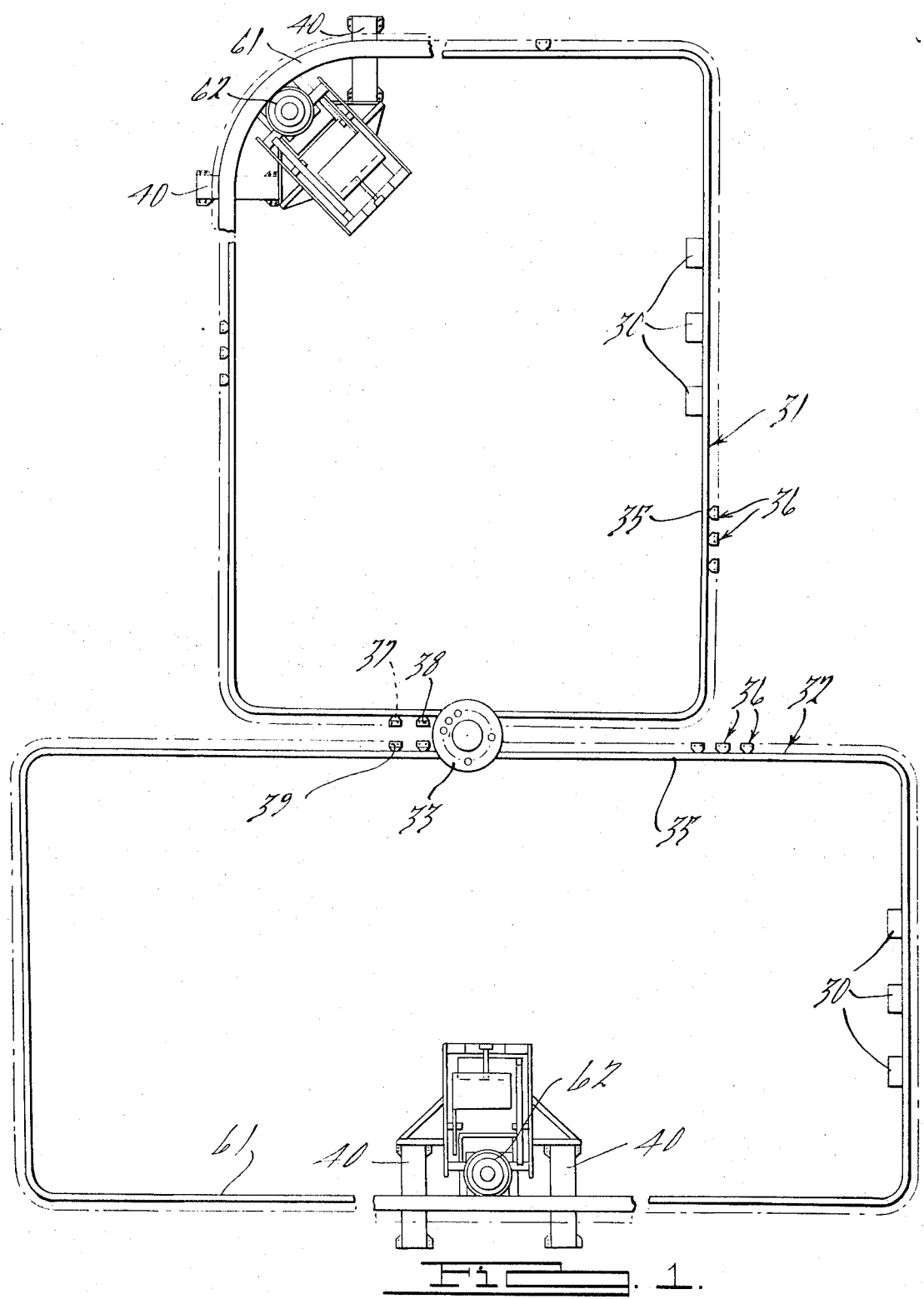

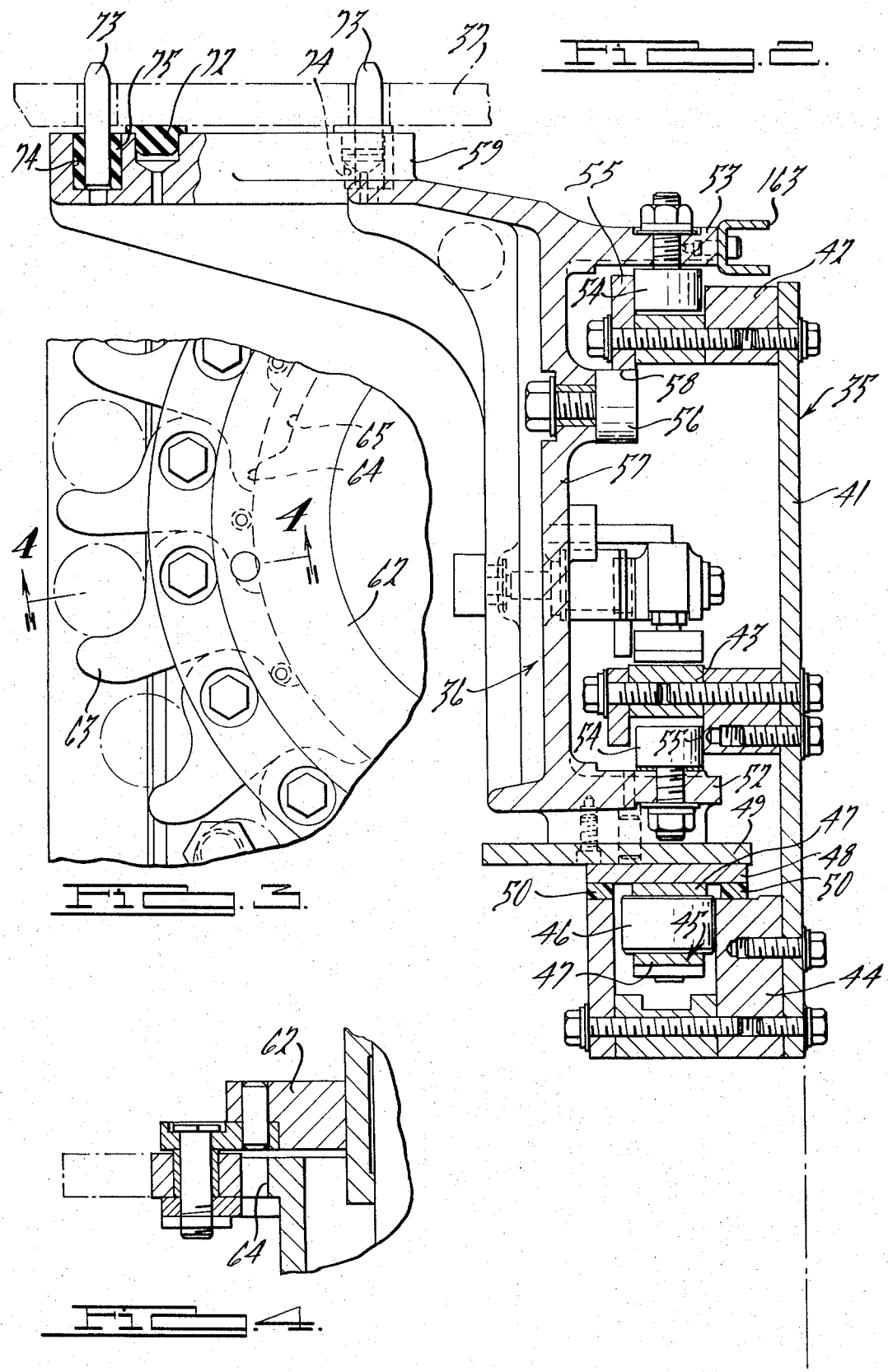

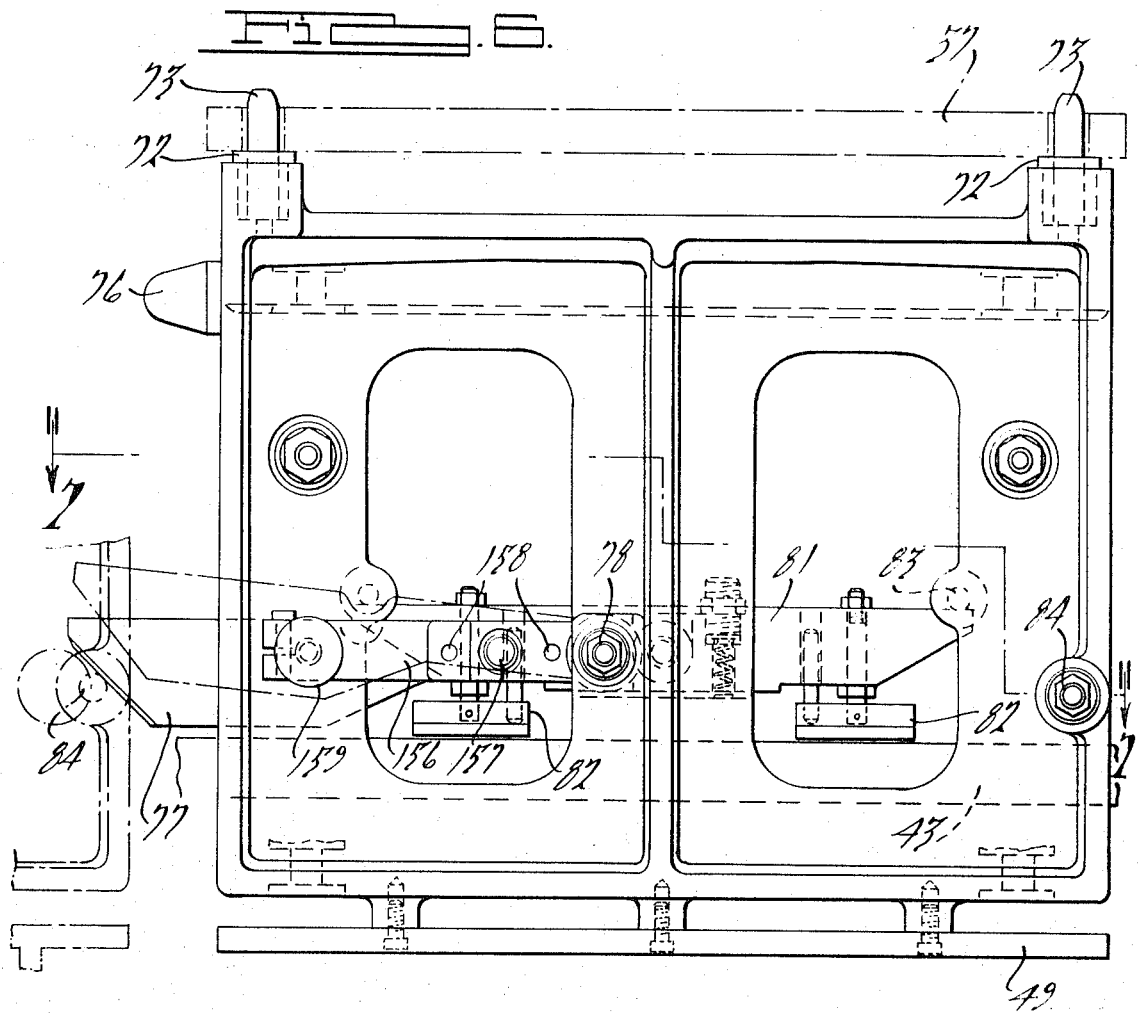
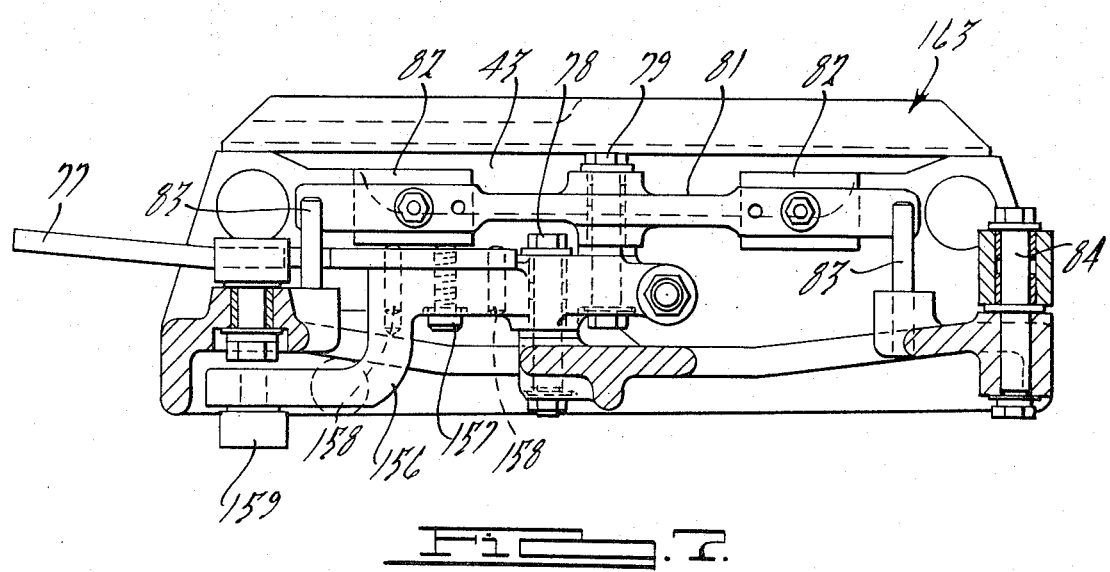

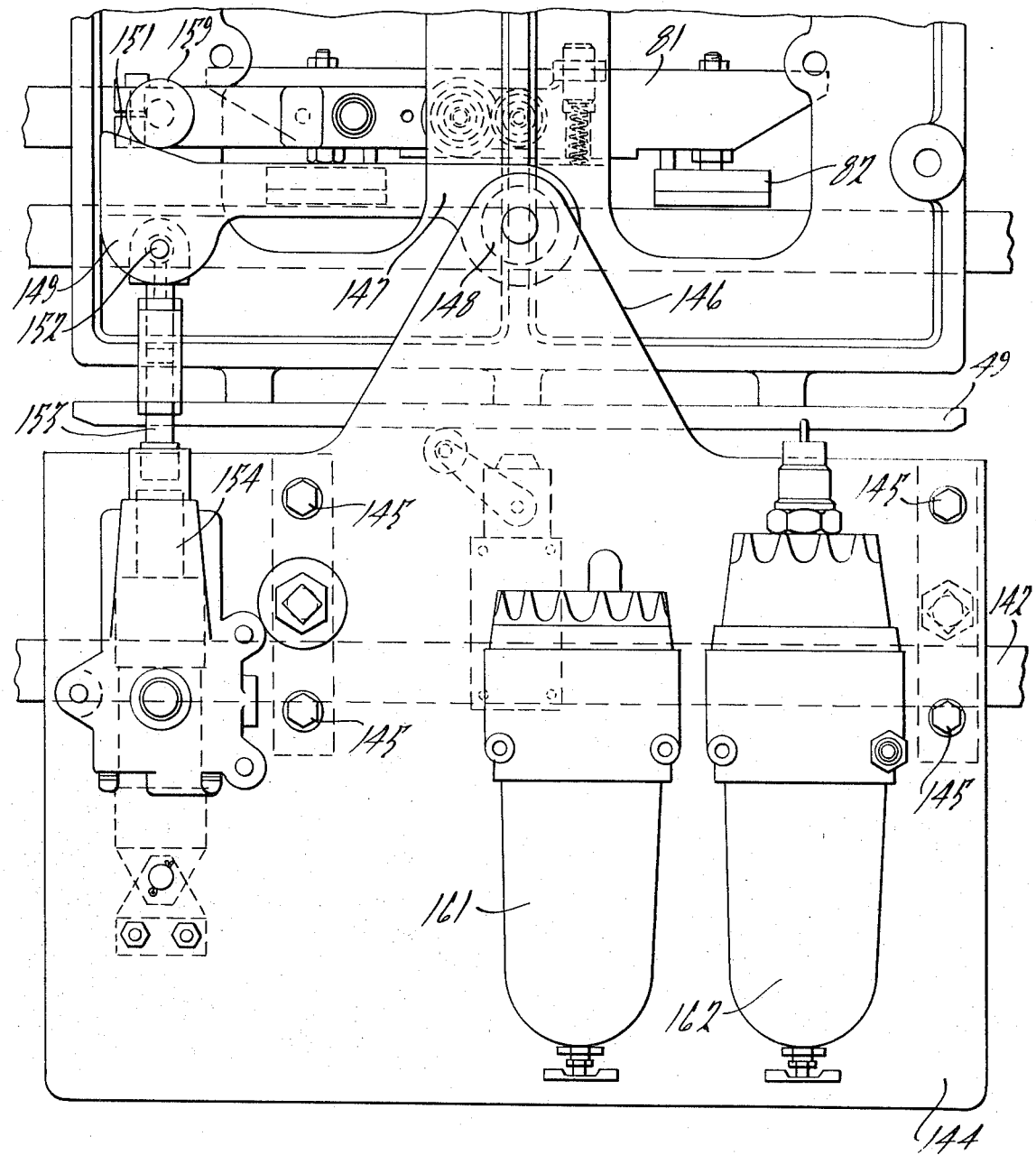

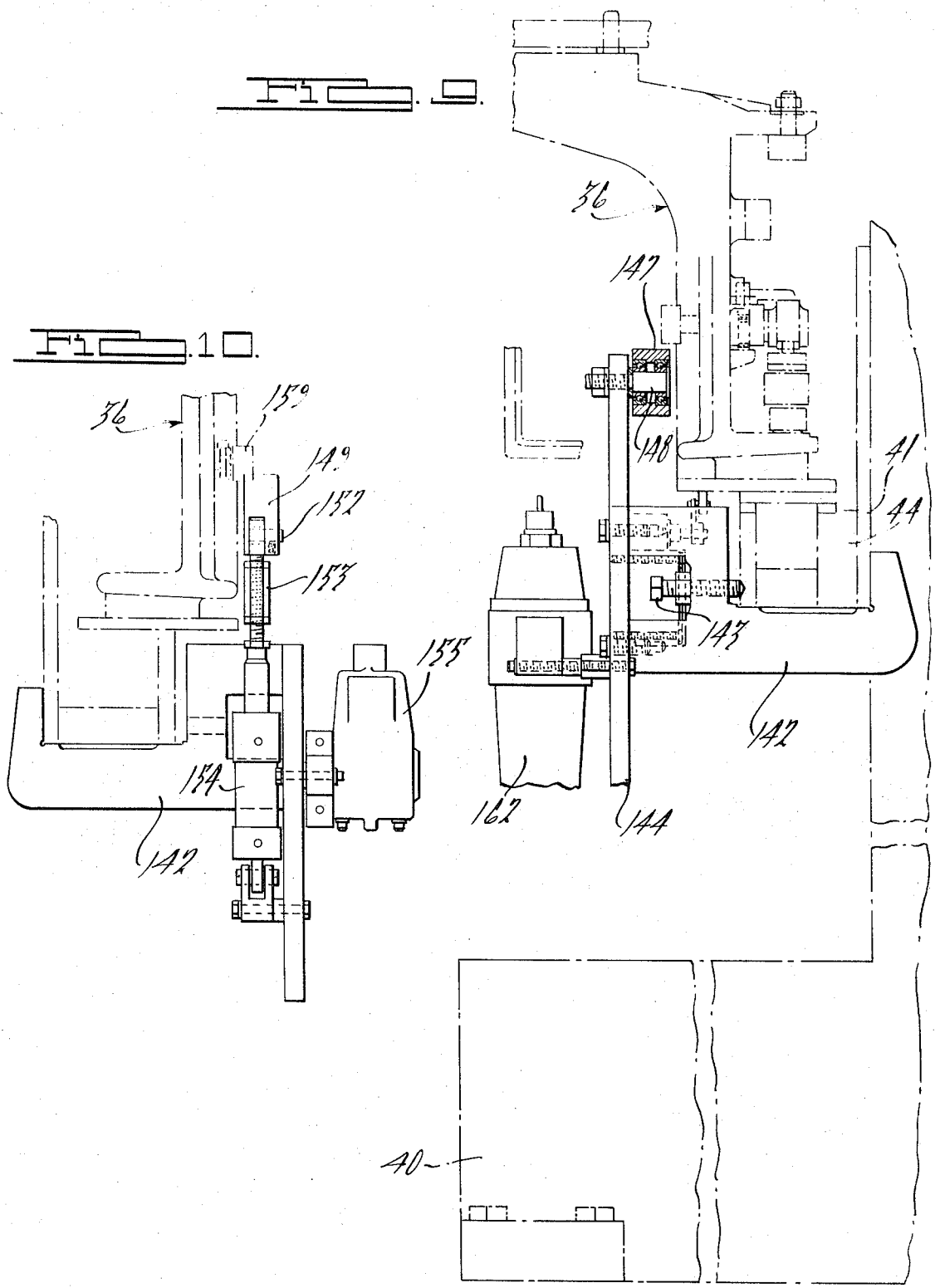

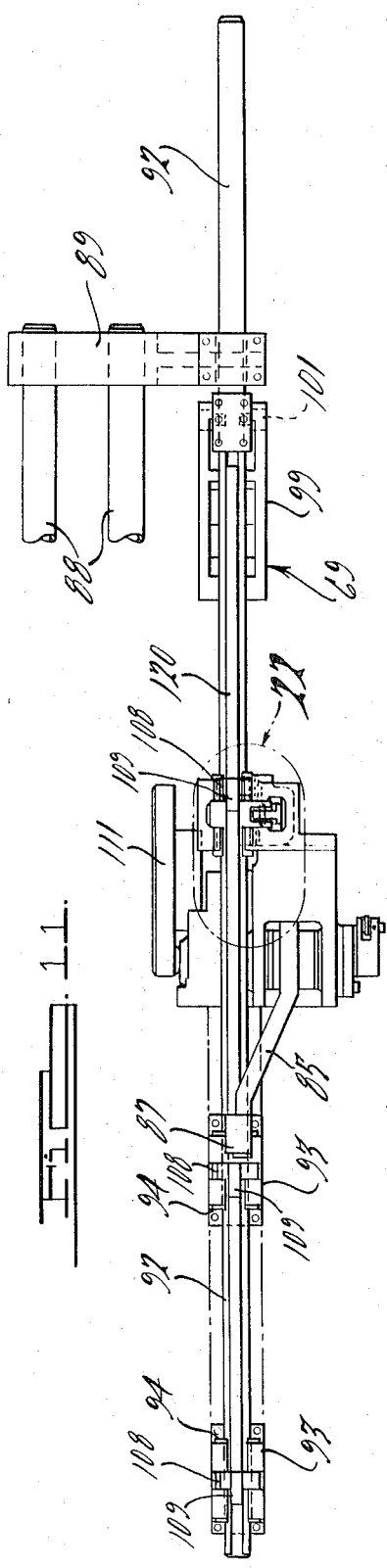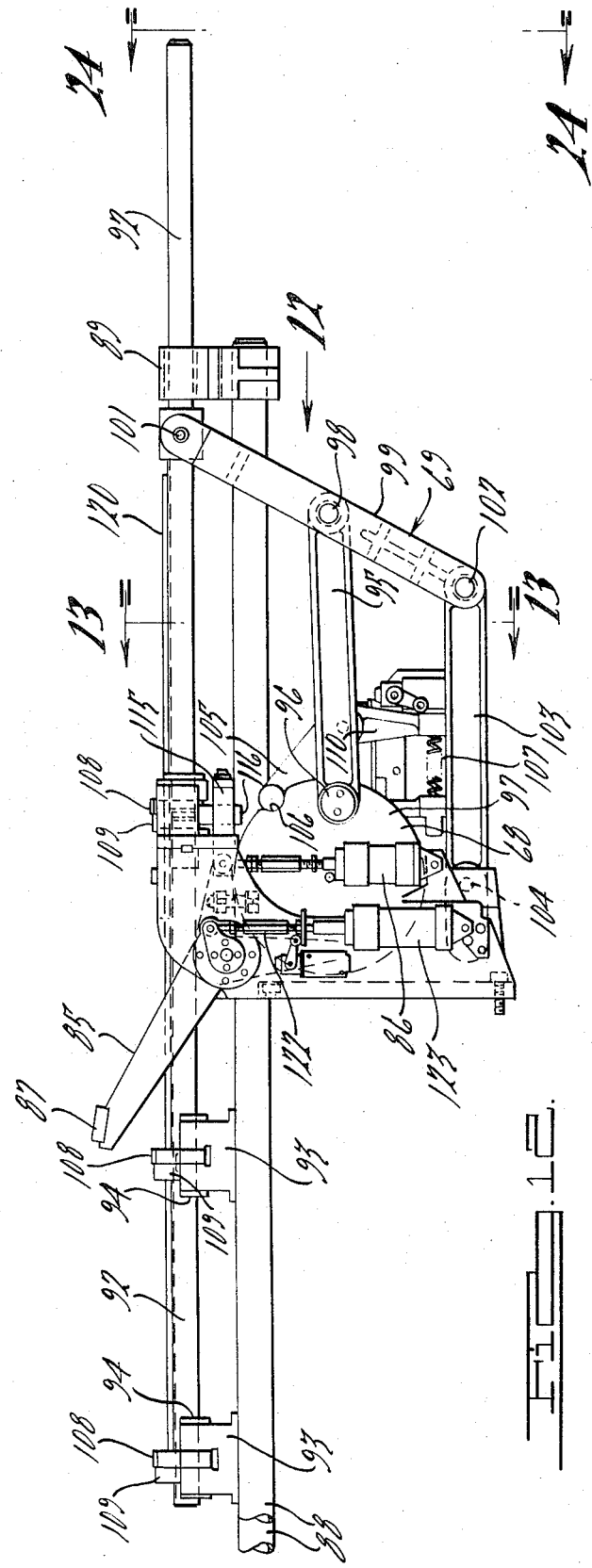

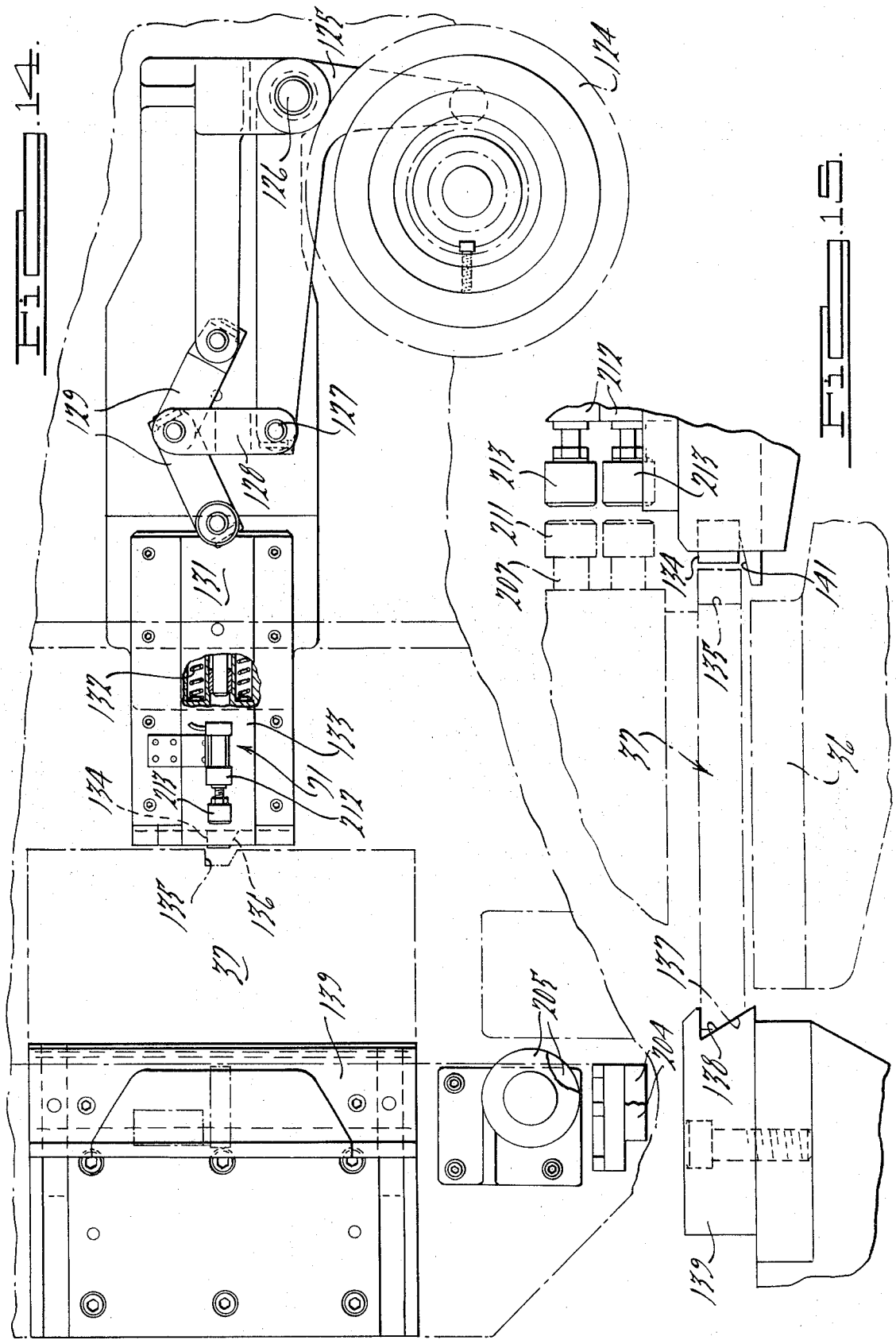

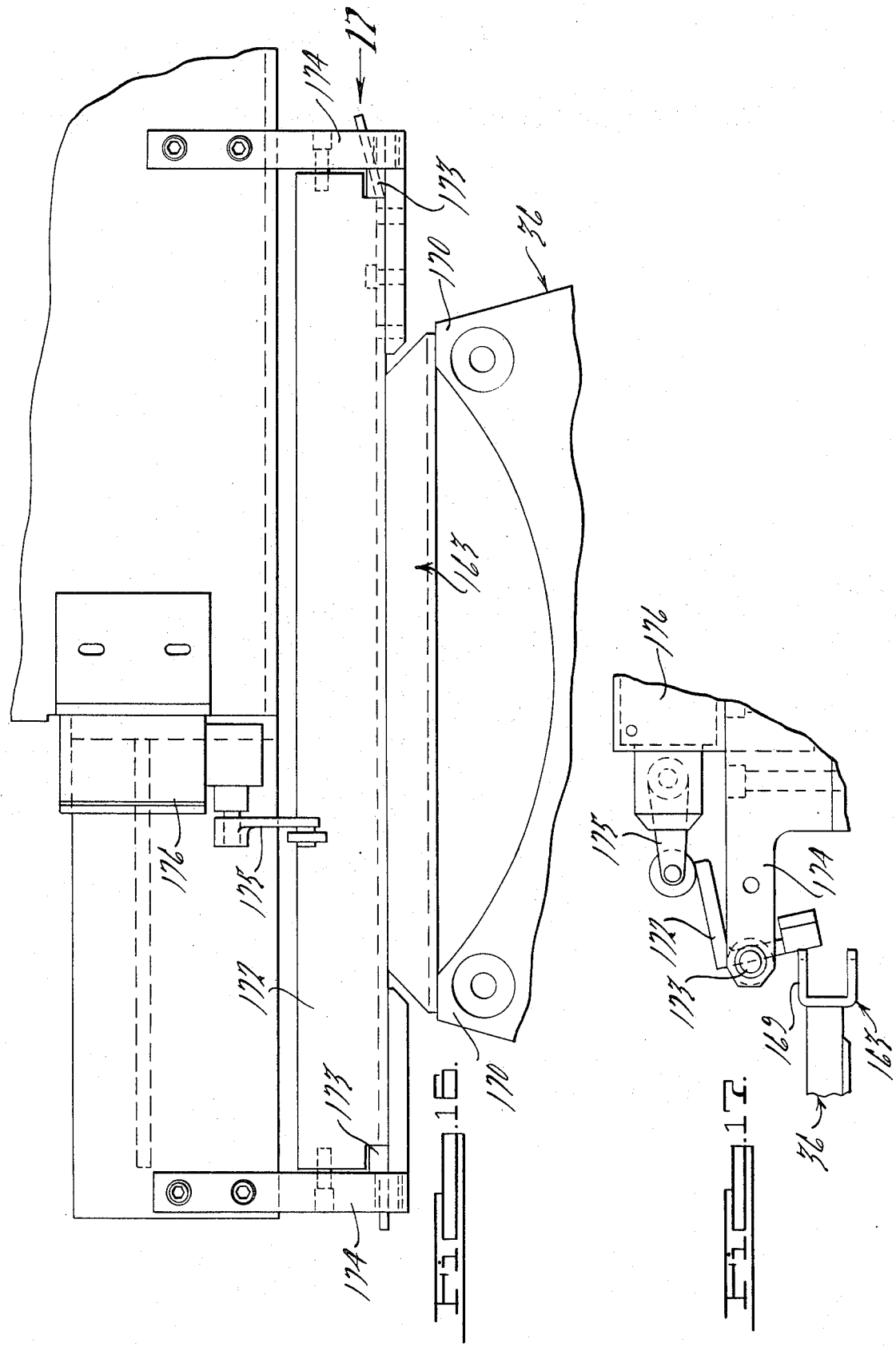

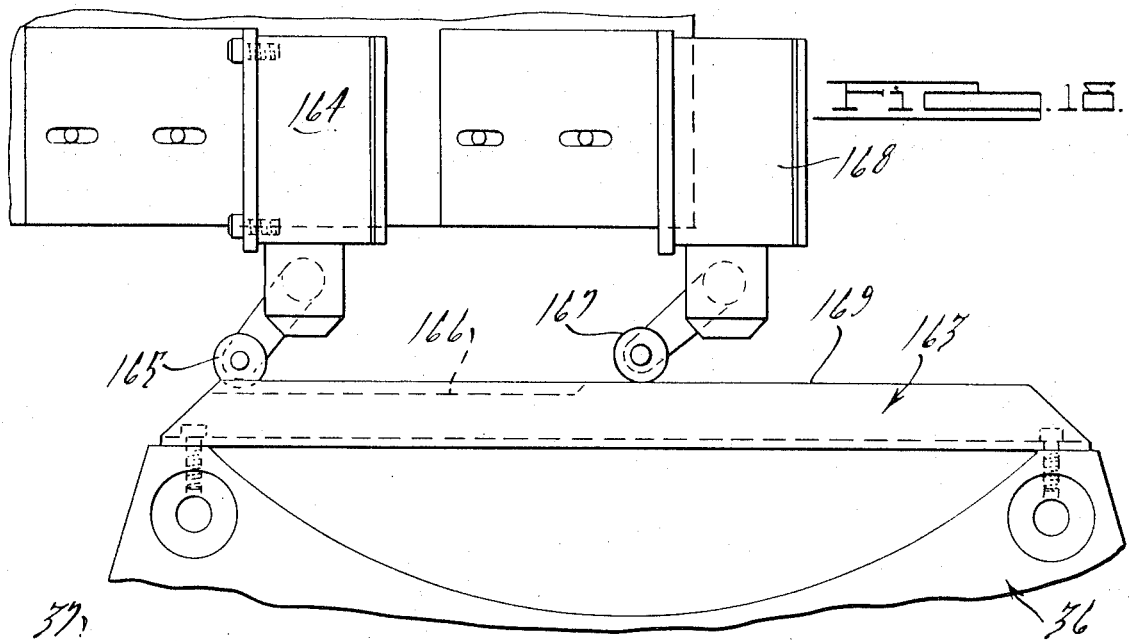
FIG. 18.
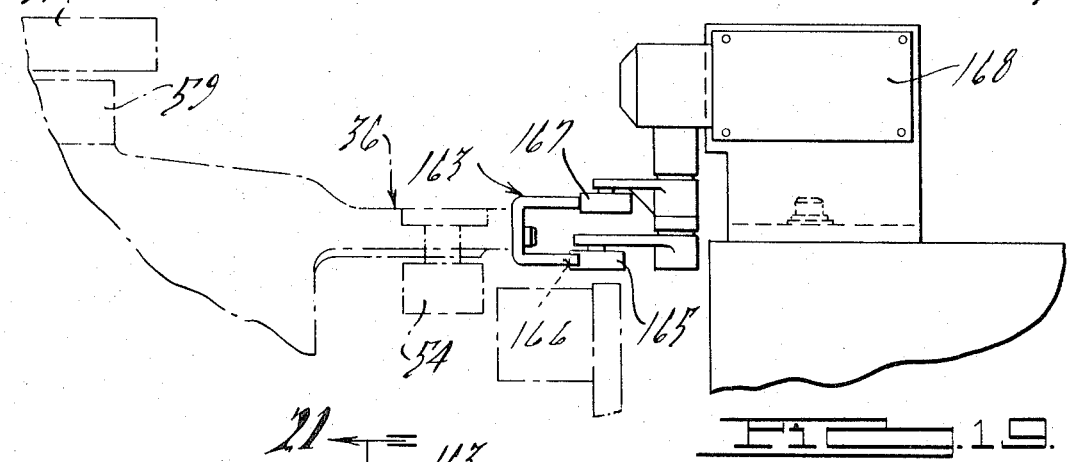
FIG. 19.
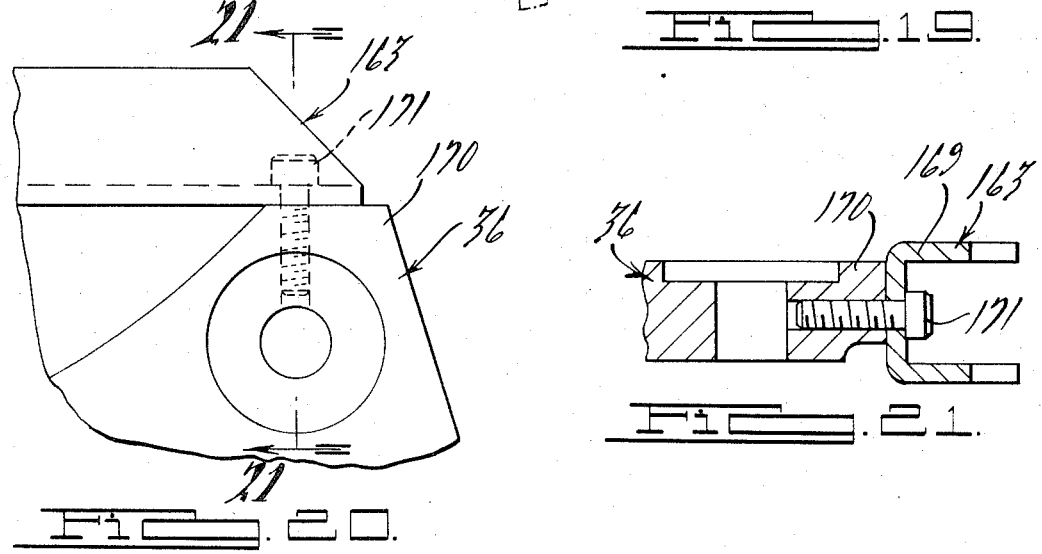
FIG. 20.
FIG. 21.

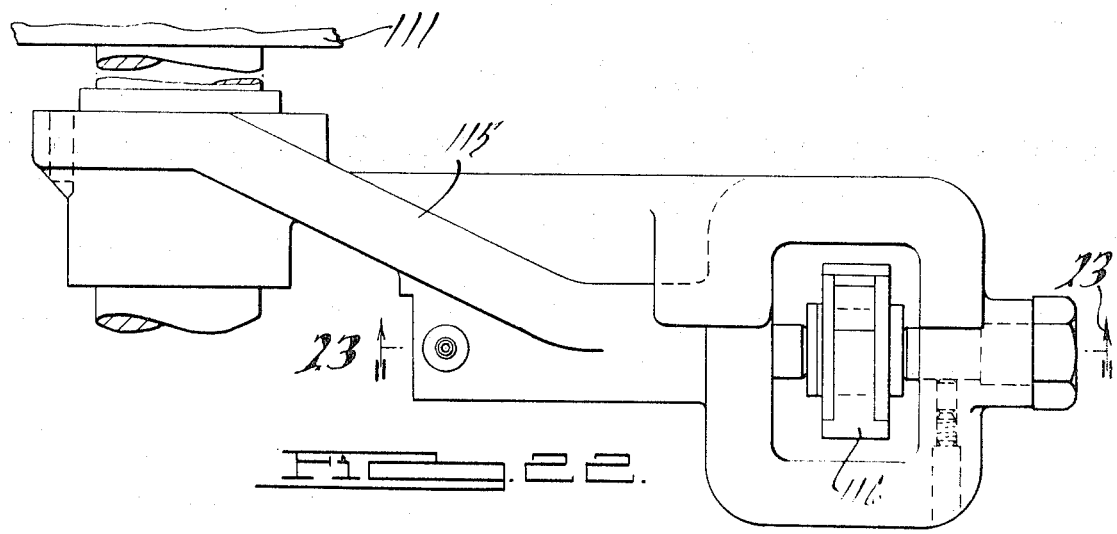
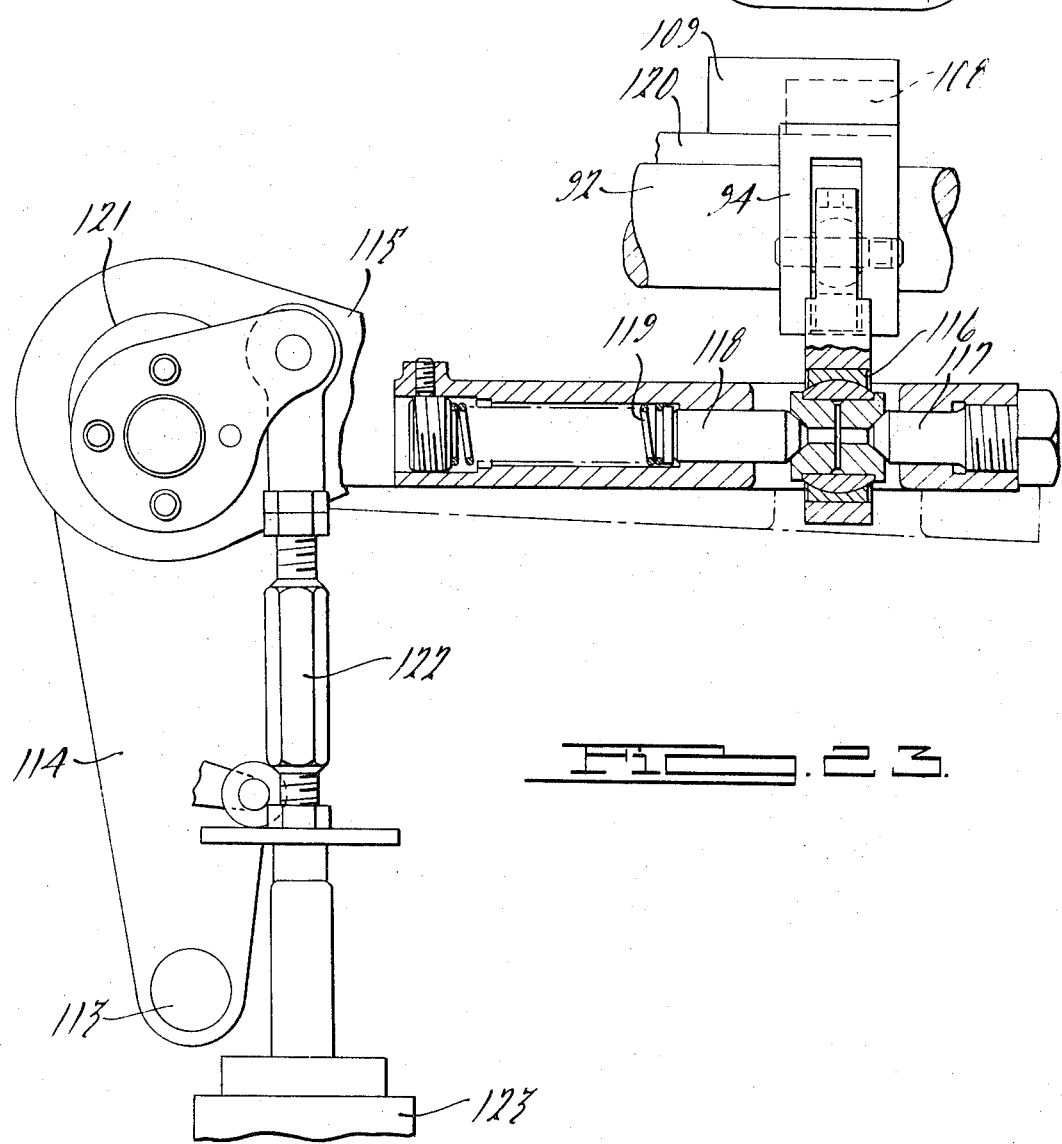

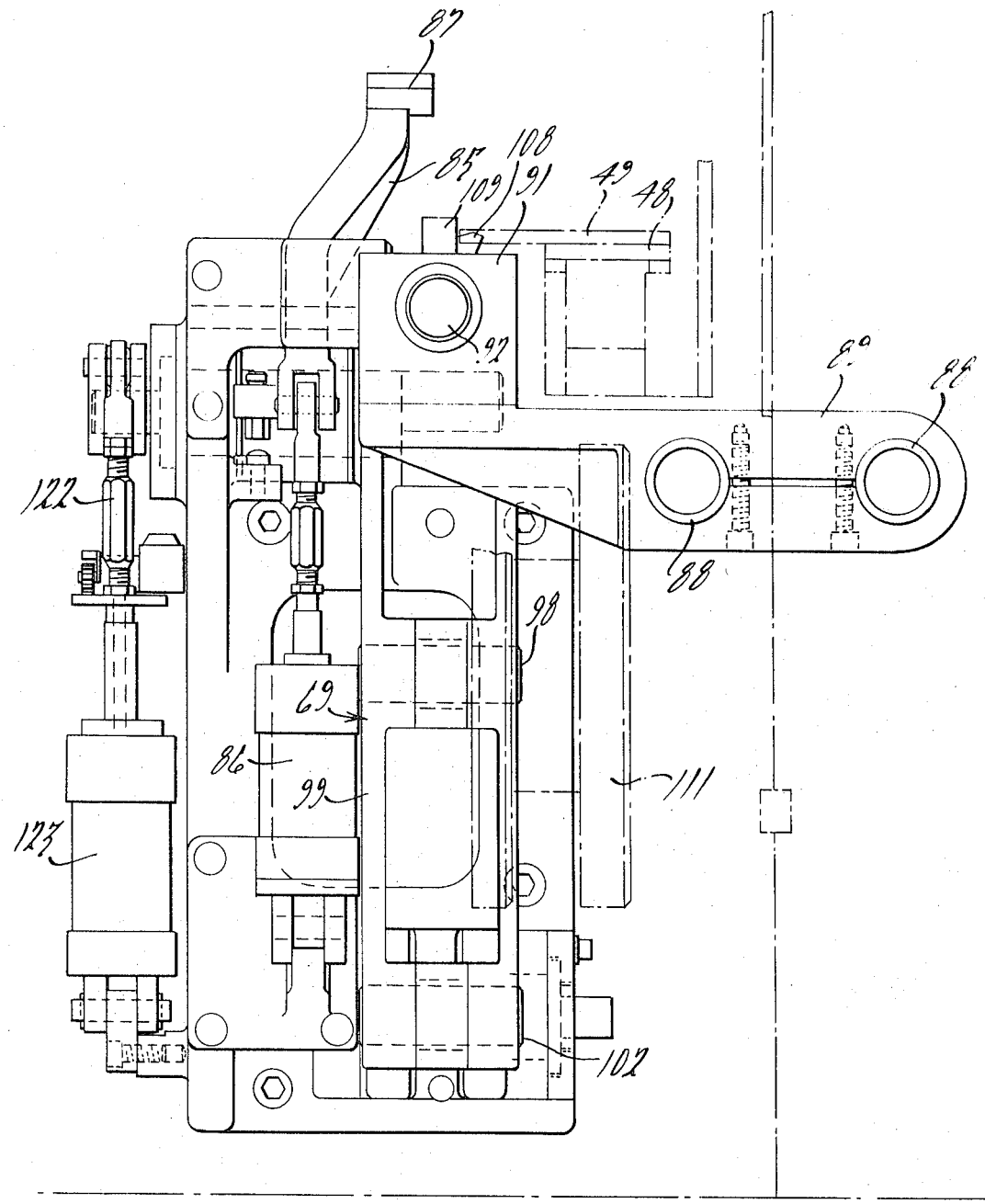

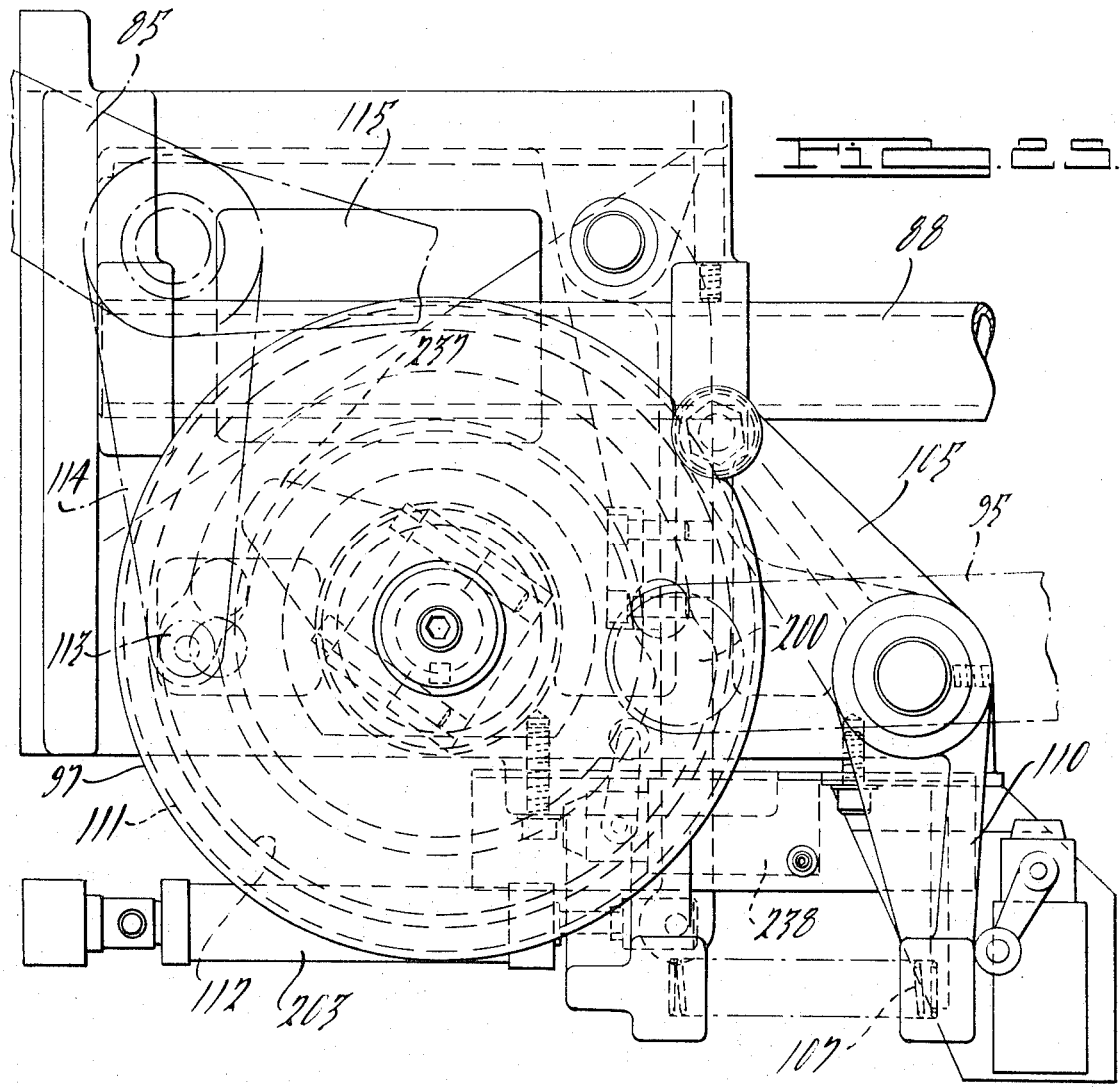
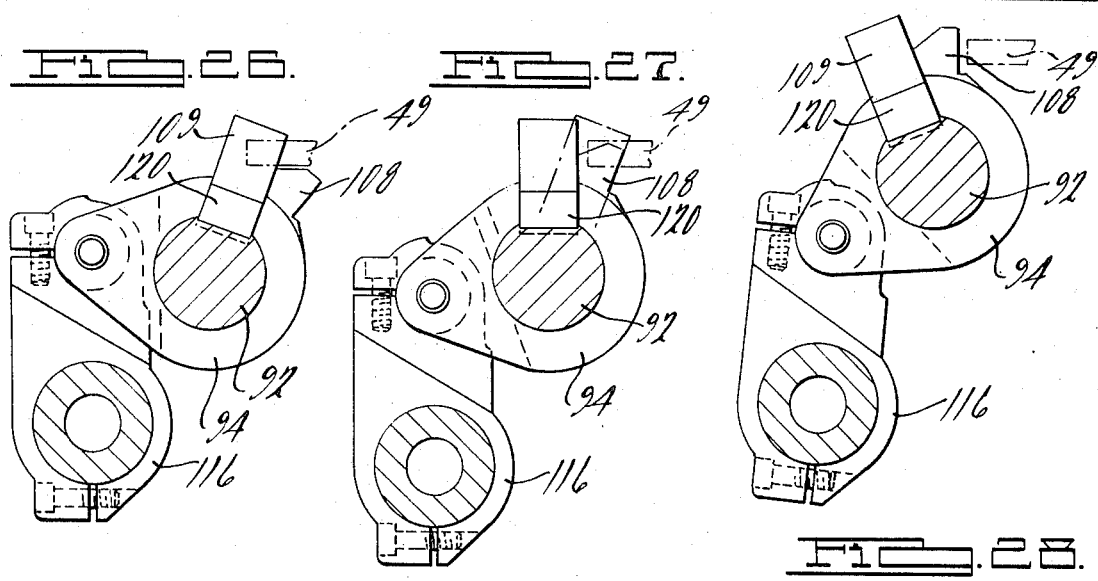

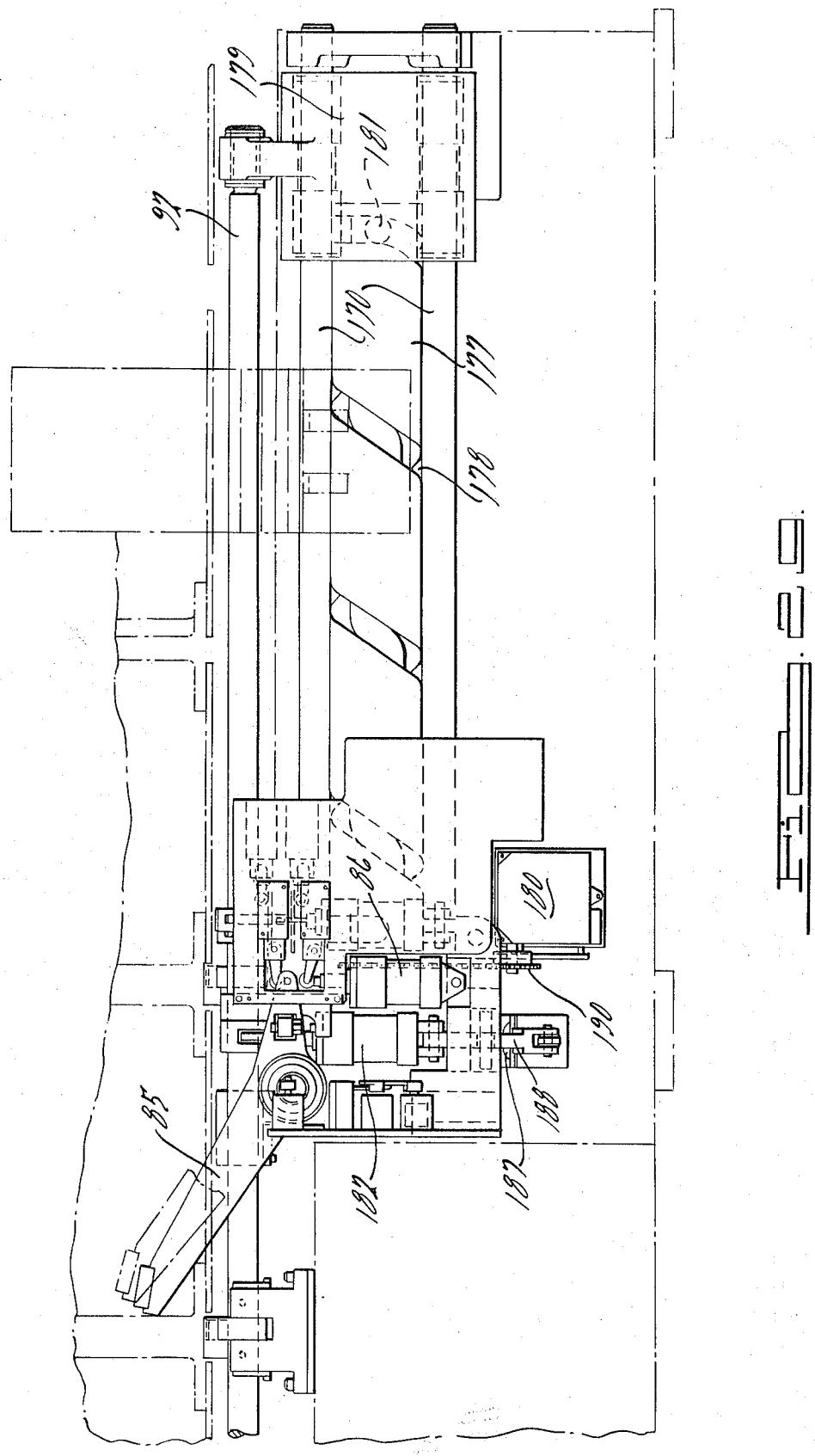

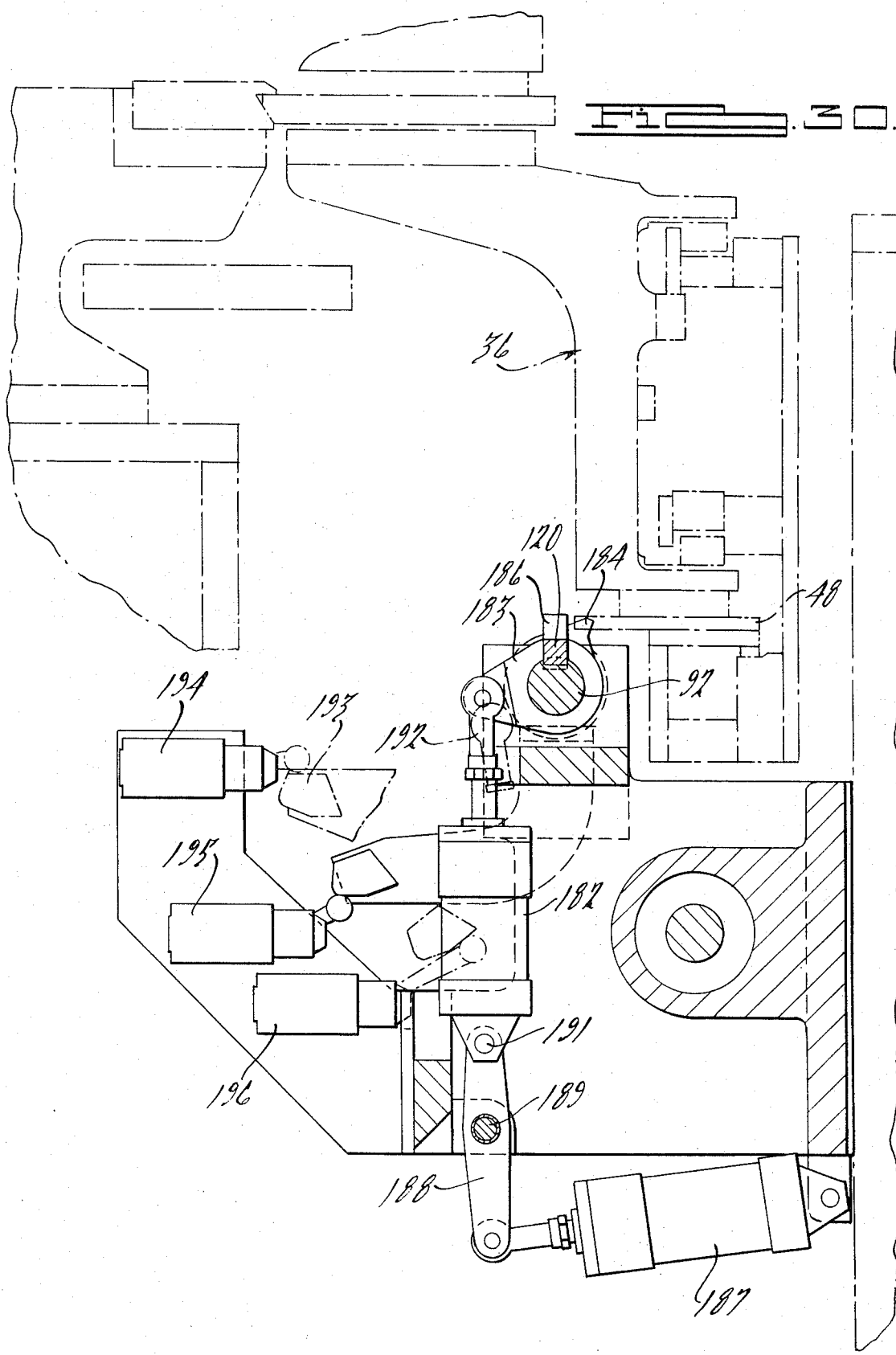

NONSYNCHRONOUS CONVEYOR SYSTEM

BACKGROUND OF THE INVENTION

Reference may be had to U.S. Pat. No. 3,646,656, issued Mar. 7, 1972 to Z. E. Zilahy et al. for "Machine Having Overhang Supports for Pallets" and assigned to the assignee of the present invention and also U.S. Pat. No. 2,856,054 and Reissue U.S. Pat. No. 25,886 to show machines having free carriers driven by a chain.

RELATED APPLICATION

Reference may be had to the application of A. L. Dato et al., Ser. No. 128,305, filed Mar. 26, 1971 for "Control Mechanism For Advancing and Locating Pallets" for a disclosure of a shuttle control for advancing a pallet into a station.

SUMMARY OF THE INVENTION

The invention pertains to the control for carriers which are mounted on a vertically disposed track in a closed loop. The carriers have a vertically disposed body portion with rollers thereon which guide it along the track. The carriers are provided with an overhanging pallet supporting ledge on which the pallet rests as it is advanced between the stations. The pallets may be employed for supporting workpieces which are moved into a station to have a machine operation performed thereon or to have an assembly operation take place depending on whether the machine is to perform machining or assemblying operations or both. The system illustrated shows two loop portions and is constructed for assembly operations, the first loop portion assembles the parts for one sub-assembly, the other loop portion assembles the parts of another subassembly with a transfer device between the loop portions which moves the sub-assemblies together and completes the product therefrom.

In the machine illustrated, one loop portion approximately 75 carriers thereon while the other loop portion has approximately 107 carriers thereon. Substantially all of the assembly operations at a station can be performed in a predetermined time which may be five seconds. Several other operations may require more time, say approximately eight seconds. Two stations are provided at this point of the assembly so that eight-second operations can be performed at the two stations while two normal operations will be performed in 10 seconds of time. To positively advance the carriers into and from the stations a shuttle mechanism is provided which first applies a brake to stop the carrier in the collecting area ahead of a station without shock or noise and to release it to have it advanced a very short distance by the chain to a positive stop.

Stop elements and fingers are mounted on an angularly shiftable longitudinally movable shuttle bar which permit the stop elements to be moved from, and the fingers to be moved between the wear plates at the bottom of adjacent carriers. The shuttle bar is then advanced to move the carriers and pallets from and into the station a distance of approximately 17 inches. The pallet is engaged and secured to accurately locate the workpiece thereon relative to the elements at the station which performs the work operation thereon. The advancement of the carrier into the station positively advances the preceeding carrier therefrom which is released by the foremost finger and stop element. When the fingers are moved from between the wear plates leaving the stop element therebetween the shuttle bar is returned to its retracted position ready to advance the next adjacent carrier retained in the collecting area ahead of the station.

A carrier stop mechanism may be attached at substantially any point along the track for stopping a carrier thereat. A valve operated element actuated by the hand, foot, timing element or the like raises a lever which intercepts the brake lever for stopping and releasing the carrier which is advancing along the track. This permits the manual performance of an operation near a station where a defective operation was performed. A flag system and reader checks the operation performed at each station and if found defective, no further operations will be performed thereon and the manual mechanism is employed ahead of the station until the operation performed at the station is corrected.

BRIEF DESCRIPTION OF THE DRAWINGS

FIG. 1 is a plan view of a machine having two palletized closed loops with a transfer mechanism therebetween which embodies features of the present invention;

FIG. 2 is a sectional view of a vertical track for a plurality of carriers having a pallet thereon with drive means for the carrier;

FIG. 3 is an enlarged broken plan view of the driving sprocket for the chain which advances the carriers on the track;

FIG. 4 is a sectional view of the structure illustrated in FIG. 3, taken on the line 4—4 thereof;

FIG. 6 is a front view of a carrier with a brake thereon operated from a carrier ahead thereof;

FIG. 7 is a sectional view of the structure illustrated in FIG. 6, taken on the line 7—7 thereof;

FIG. 8 is a front view of a carrier stopping mechanism which may be applied to the carrier track at substantially any points therealong;

FIG. 9 is a broken end view of the structure illustrated in FIG. 8, as viewed from the righthand side thereof with a part in section;

FIG. 10 is a view of the structure illustrated in FIG. 8, as viewed from the lefthand side thereof;

FIG. 11 is a plan view of the shuttle mechanism located at a station into which a carrier is to be delivered;

FIG. 12 is a front view of the structure illustrated in FIG. 11;

FIG. 14 is a broken plan view of the mechanism for orienting and clamping a pallet at a work station;

FIG. 15 is an end view of the structure illustated in FIG. 14;

FIG. 16 is a view of a carrier at the time of leaving a station where the existence of a carrier thereat is checked;

FIG. 17 is a broken end view of the structure illustrated in FIG. 16, as viewed from the point 17 thereof;

FIG. 18 is a plan view of a pair of switch mechanisms actuated by the edge of a channel element attached to each carrier;

FIG. 19 is an end view of the structure illustrated in FIG. 18;

FIG. 20 is an enlarged corner view of the structure illustrated in FIG. 18;

FIG. 21 is a sectional view of the structure illustrated in FIG. 20, taken on the line 21—21 thereof;

FIG. 22 is an enlarged broken view of the structure illustrated in FIG. 11, as viewed within the elipse 22 thereof;

FIG. 23 is a sectional view of the structure illustrated in FIG. 22, taken on the line 23—23 thereof;

FIG. 24 is an enlarged end view of the structure illustrated in FIG. 12, as viewed from the line 24—24 thereof;

FIG. 25 is an end view of the drive mechanism for each station illustrated in FIG. 13 for advancing the shuttle bar and producing the rotary position thereof;

FIG. 26 is a sectional view of the shuttle bar rotated to a position for advancing carriers into and out of a station;

FIG. 27 is a view of structure illustrated in FIG. 26, with the shuttle bar rotated to a position for retaining the carriers in advanced position as th shuttle bar is retracted;

FIG. 28 is a view of the structure as illustrated in FIGS. 26 and 27 with the shuttle bar rotated to a position in which the carriers pass through a station without being stopped;

FIG. 29 is a view of structure, similar to that illustrated in FIG. 12, showing a different operating mechanism for the shuttle bar;

FIG. 30 is a view of structure, similar to that illustrated in FIGS. 25 to 28 for rotating the shuttle bar when the mechanism of FIG. 29 is employed at a station;

DESCRIPTION OF THE PREFERRED EMBODIMENTS

Figure 5:
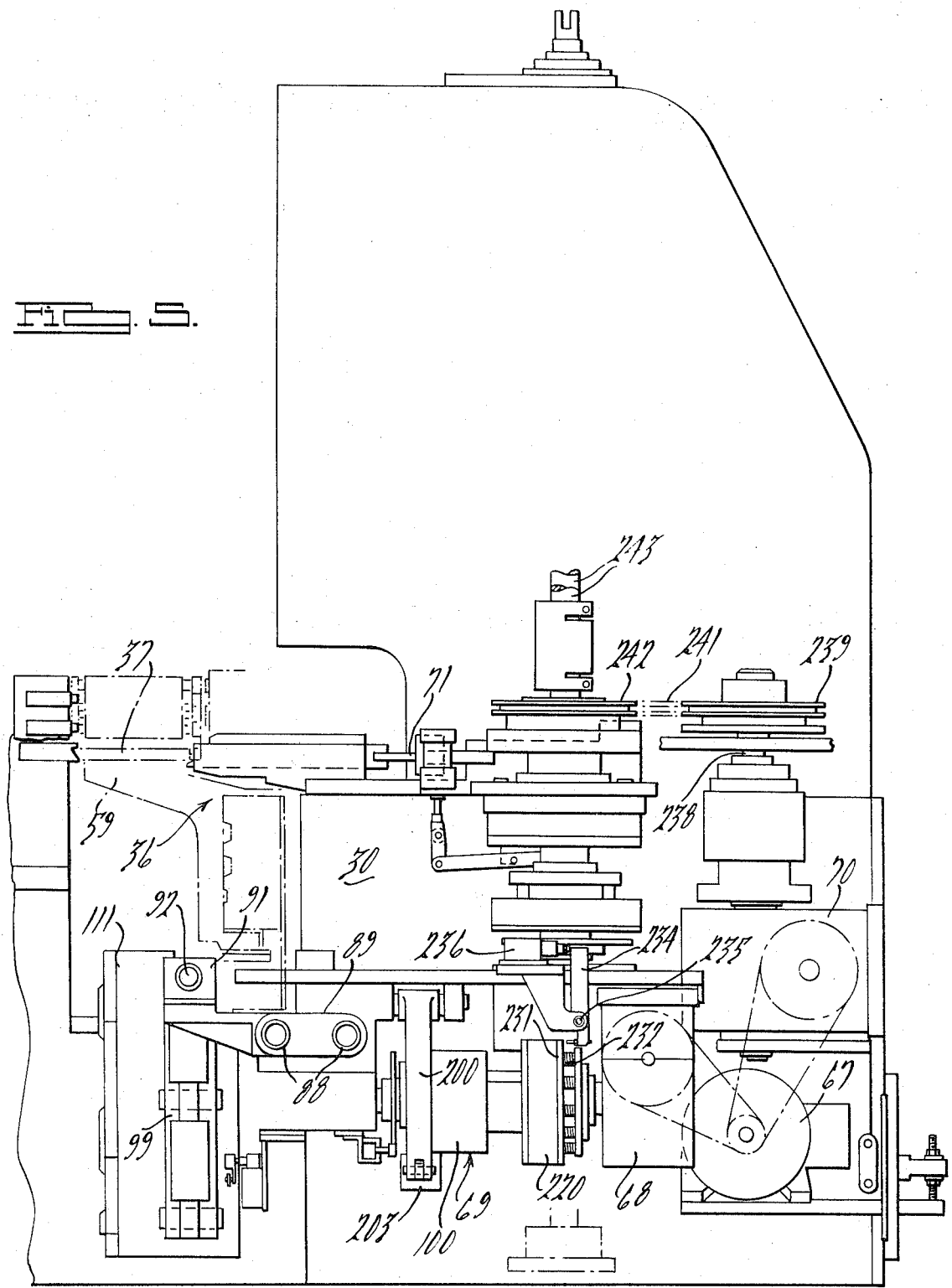
FIG. 5 is an end view of a station into which the carrier is advanced to have a work operation performed on the workpiece thereon.

In FIG. 1, a comprehensive palletized machine is illustrated having a first branch loop 31 for progressively operating on a workpiece which is to be assembled with an element operated on in a second branch loop 32. To be specific, one element of a product to be assembled has parts assembled thereon in the branch loop 31 of the machine and the other element of the product is assembled therewith and further worked upon to complete the product in the branch loop 32. The one element is transferred from the branch loop 31 to the other element in the branch loop 32 by a transfer station 33 located therebetween. It is to be understood that machining or assembling operations could be performed at a station separately or a combination of both could be performed. Vertical track systems 35, forming the two branch loops 31 and 32, have carriers 36 supported on the outer face thereof for advancement therealong. An elongated pallet 37 is mounted on each carrier which is advanced from station to station where the assembly operations are performed seriatim thereon. In the device herein illustrated, each pallet supports a pair of elements 38 or 39 so that the pair can be operated upon simultaneously in each of the stations.

As illustrated in FIG. 2, the track has an inner plate 41 of predetermined length, the ends of which are attached to L-shaped supporting legs 40. The plates 41 support a top rail strip 42, a brake shoe engaging strip 43 in the center and a chain supporting strip 44 at the bottom. A chain 45 is of conventional form having rollers 46 which are interconnected by top and bottom overlapping links 47. Each link at the top of the chain has a wear plate 48 secured thereto which engages a wear plate 49 at the bottom of a carrier 36. The chain supporting strip 44 has wear strips 50 therealong of high molecular weight polyethylene which has high impact, shock and wear resistance. the wear strips are known under the name Pactene and are procurable from Schmidt Industries, 133 Court Street, Post Office Box A-995, New Bedford, Massachusetts 02741.

The carrier has rearwardly extending arms 52 and 53 on which rollers 54 are mounted in facing relation for running on tracks 55 on the top rail strip 42 and the brake shoe engaging strip 43. A vertically disposed roller 56 supported on a vertical body portion 57 of the carrier engages a face 58 of the top rail strip 42. The carrier extends outwardly at the top to form a horizontal platform 59 on which the pallet 37 is supported. The chain 45 is continuously driven at an arcuate corner 61 of the branch loops 31 and 32 by a driven sprocket 62 having a plurality of cam operated fingers 63 pivoted thereto which are held in operating position by a cam 64 and released from such position when dropping onto a dwell portion 65 thereof. It will be noted that the arcuate corner of the two closed loops 31 and 32 where the chain drive occurs has been enlarged to show the drive mechanism and the support therefor. The sprocket is illustrated, described and claimed in a copending application of Prescott V. Murphy Ser. No. 291,977, filed Sept. 25, 1972; for Chain Drive Having Pivoted Drive Teeth and assigned to the assignee of the present invention. The sprocket is driven at a predetermined speed from a motor through a gear reducing unit in the conventional manner. As the chain is driven, the wear plates 48 thereon have friction engagement with the wear plates 49 on the carriers 36 and advance the carriers along the track to a station where work is to be performed, such as the station 66 illustrated in FIG. 5. The carrier 36 is stopped in a holding area before it enters the station so that it can be positively advanced thereinto independently of the chain 45.

As illustrated in FIG. 5, a motor driven gear reduction unit 67 drives a reduction gear unit 68 to drive a shuttle mechanism 69 which advances the carriers into and out of the stations. The unit 67 also drives a gear reduction unit 70 which drives the work performing mechanism at the station. The carrier 36, after being advanced into the station, has its pallet 37 oriented longitudinally and transversely and raised and secured in predetermined position by a locking mechanism 71 operated by the station drive. The overhanging platform 59 of each carrier has rubber bushings 72 therein, as illustrated in FIG. 2, on which the pallet is supported. The platform 59 has a pair of pins 73 disposed on opposite corners in apertures 74 which contains an elastic sleeve 75. The elastic sleeve permits the degree of shifting of the pins in the plane of the platform necessary to accurately orient the pallet at a station. The forward edge of the carrier has a rubber bumper 76 which is normally not used but which can soften any shock which could occur should the carrier be advanced beyond a normal stop element.

As illustrated in FIGS. 6 and 7, the carrier has an arm 77 which is pivoted on a stud 78 and supports a bolt 79 at the opposite end on which a cross link 81 is pivotedly supported. Each end of the cross link 81 has a brake shoe 82 pivoted thereon adjacent to the brake shoe engaging strip 43. A pair of pins 83 extend over the top of the ends of the cross link 81 to restrict the tilting movement thereof. When the operating arm 77 is moved upwardly, as by a roller on a pin 84 at the rear of each carrier, it moves to the dot and dash line position illustrated in FIG. 6. This moves the cross link 81 downwardly to progressively apply the brake shoes 82 to the brake shoe engaging strip 43 to slow down and stop the advancement of the carrier. The downward movement of the brake shoes raises the wear plate 49 of the carrier from the wear plate 48 of the chain and eliminates the friction engagement therebetween. A shuttle mechanism 69 is located ahead of the station to permit the stopped carrier to be picked up thereby and advanced to the work-performing position of the station.

Figure 13:
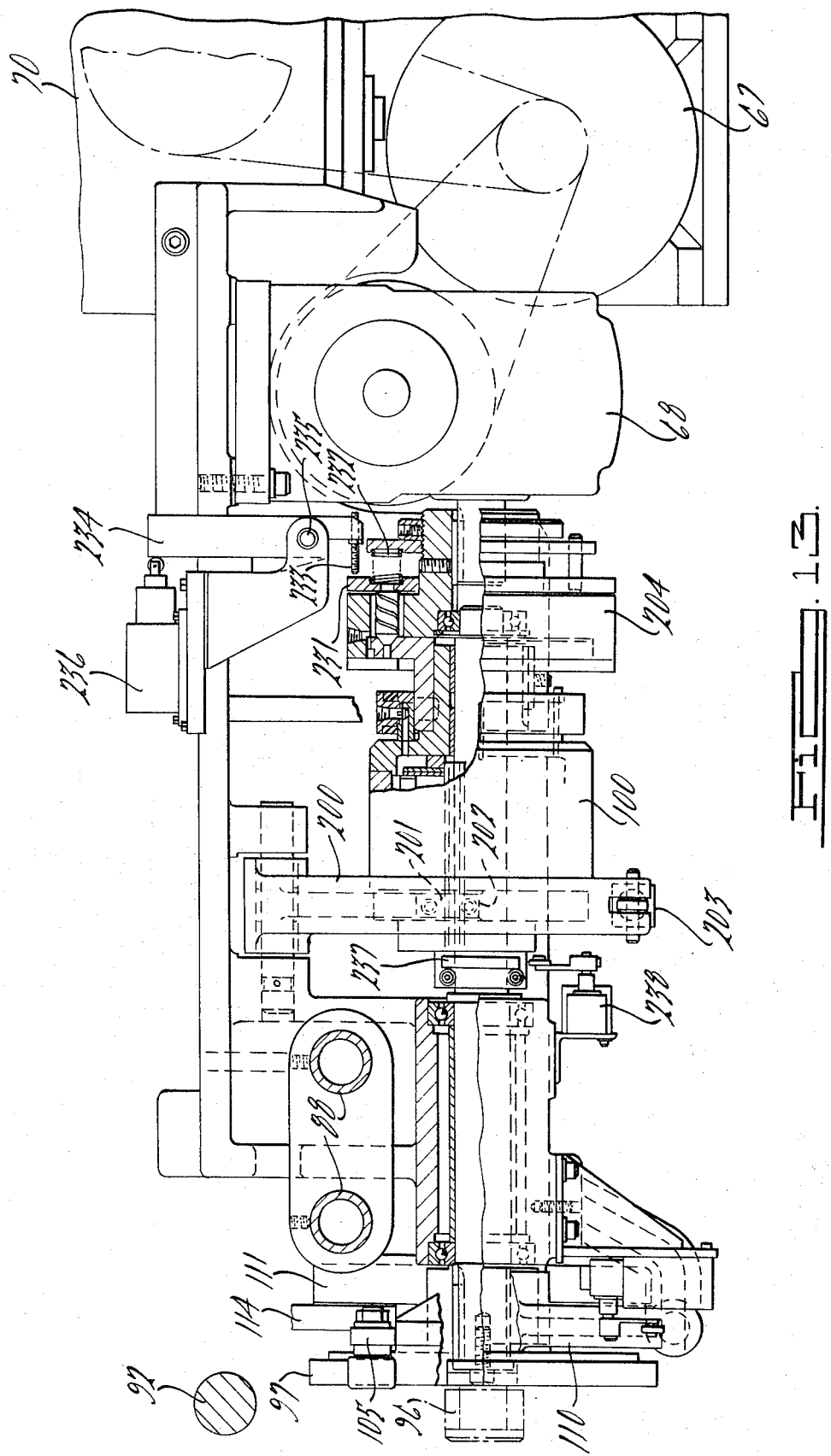
FIG. 13 is an enlarged broken sectional view of the structure illustrated in FIG. 12, taken on the line 13—13 thereof.

As illustrated in FIGS. 13 and 24, a pair of support rails in the nature of tubes 88 are mounted at each station having a bracket 89 secured thereto which has a boss 91 at the forward upper end for supporting one end of a shuttle bar 92 extending forwardly thereof. As illustrated in FIGS. 11 and 12, the tubes 88 support cradles 93 having a rotatable slotted sleeve 94 mounted therein which is rotated with the shuttle bar 92 and in which the shuttle bar is longitudinally movable. The control mechanism 69, as illustrated in FIGS. 5, 11 and 12, operates a drive link 95 which is secured by a pivot 96 to a disc 97. The opposite end of the drive link is secured by a pivot 98 to the center of a link 99 which has its upper end secured to the shuttle bar 92 by a pin and block assembly 101. A pivot 102 secures the bottom end of the link 99 to a link 103 which has its opposite end secured by a pivot 104 to the frame of the device. After one revolution of a single revolution clutch 100, a roller on the end of a pivoted arm 105 is forced into a notch 106 on the periphery of the disc 97 by a spring 107 engaging an extending end 110 of the arm 105 for accurately locating the drive link 95 each revolution of the disc 97. A pivoted link 200 has a block 201 engaged with a shoulder of a cam 202 and is moved outwardly by a ram 203 to release the block 201 and permit the single revolution clutch 100 to rotate a single turn.

The shuttle bar 92 has a bar 120 along its top edge which extends from the slots in the sleeves 94 to rotate the sleeves therewith. A stop element 108 extends from each sleeve 94 and a finger 109 is secured to the bar 120 in alignment with each stop element. The stop element 108 and fingers 109 extend between the wear plates 49 of the carriers which project a substantial distance outwardly from the wear plate 48 of the chain. The stop elements 108 and fingers 109 controls the position of the carriers when being moved into and from the stations. When the fingers 109 are moved between the wear plates 49 of adjacent carriers and the stop elements 108 are moved therefrom, the operation of the shuttle bar 92 advances the carriers into and from the station. When the shuttle bar 92 is reversely rotated, the fingers 109 are moved to a vertical position, as illustrated in FIG. 17, with the stop elements 108 engaging the wear plates 49 to hold them in advanced position while the shuttle bar 92 is retracted and rotated to move the fingers between the wear plates with the stop elements moved therefrom. The next adjacent carrier is stopped at the holding area of the station by the arm 85 which is lowered to release the carrier which is advanced against the stop element 108 so that the shuttle bar 92 can be again actuated to advance the carriers into and from the station. The arm 85 is moved down by the ram 86 to release the brake on the carrier so that it can be advanced by the chain against the element 108. There is only a slight advancement before the element 108 is engaged which will occur without impact or noise.

The drive mechanism 69 is also provided with a rotatable cam plate 111 having a two-lobe cam track 112 in which a roller 113 operates to shift an arm 114 transversely and move an arm 115 upwardly and downwardly to rotate the shuttle bar 92. The arm 115, as illustrated in FIGS. 22 to 28, has a ball ended link 116 supported between a fixed finger 117 and a spring pressed finger 118. When the link 116 is moved downwardly the sleeve 94 pivoted thereto is moved downwardly rotating the shuttle bar 92 the bar 120 of which rotates the other sleeve 94 therewith. The rotation of the bar 92 and sleeves 94 move the fingers 109 and stop elements 108 to the position illustrated in FIG. 27. The downward movement of the link 116 occurs when the roller 113 is riding in the outermost portion of the two-lobe cam track 112. The fingers 109 and stop elements 108 are reversely rotated with the shuttle bar 92 when the roller 113 engages the innermost portion of the two-lobe cam track 112, to the positions illustrated in FIG. 26. This will occur each time the disc 97 is rotated to have the carrier wear plates 49 engaged either by the stop element 108 or the finger 109. The stop elements 108 will retain the wear plates 49 in advanced position as the fingers 109 are retracted along with the shuttle bar 92 to its original position. The advancement of the shuttle bar releases the endmost wear plate 49 and carrier which is thereafter advanced by the chain to the next station. When the shuttle bar is rotated to the position illustrated in FIG. 26 with the finger 109 between the wear plates 49, it will be advanced to move the carriers into and from the station. In FIG. 28, the finger 109 and stop element 108 have been further moved counterclockwise out of a position of engagement with the wear plates 49 to permit the carriers to pass through the station when the station is defective.

It will be noted in FIG. 23 that the finger 118 is retained against the ball ended link 116 by a spring 119 which permits the link 116 to move to the left in case the stop element 108 and finger 109 are prevented from passing between the adjacent ends of the wear plates 49. The shaft 121 has an eccentric section which changes the position of the ball ended link 116 when rotated by the downward movement of a piston rod 112 of a ram 123. Thus, when the carriers are not to be stopped at a station, the operation of the ram 123 will produce the rotation of the shuttle bar 92 to the position illustrated in FIG. 28 permitting the carrier to pass through the station without being stopped. This will occur when a flag reading indicates that a defective operation has been performed at a station thereahead, as will be explained hereinafter.

After the carrier has been advanced into a station, the clamping mechanism 71 is operated to accurately locate and clamp a pallet 37 therein. A rotatable cam plate 124, driven from the drive mechanism at the station, operates a bell crank 125 on a pivot 126 to have the pivot 127 at the opposite end operate a link 128 to move a pair of toggle links 129 toward the adjacent pallet edge, as illustrated in FIG. 14. This movement advances a block 31 against a pair of springs 132 which urges a slide 133 toward the adjacent edge of the pallet 37. The slide has a projecting finger 134 with a sloping side 136 which enters a similar shaped notch 135 in said adjacent pallet edge. The mating sloping sides 136 shift the pallet lengthwise of the carrier in the direction of its advancement while the slide moves the sloping edge 137 of the pallet against a sloping surface 138 of a stop block 139 to locate it transversely of the carrier's direction of advancement. The slide 133 has a sloping lip 141 which raises the adjacent edge of the pallet 37 from the carrier 36 against the overhanging section thereabove to lock the pallet in fixed, shifted position. The pins 73 are shiftable within the rubber sleeve 75 a sufficient amount to permit the pallet to be accurately located at the work stations. At the end of the work performing cycle, the bell crank 125 is reversely operated to withdraw the block 131 and the slide 133 and permit the pallet 37 to be again supported by the carrier in the station until positively moved therefrom.

Should the operation of the mechanism at a station be defective and remain out of use until repaired, a stop mechanism for a carrier may be supported on the track ahead of the station, as illustrated in FIGS. 8, 9 and 10. The mechanism has a bottom clamping member 142 which engages the plate 41 and the chain support strip 44 to which it is secured by a plurality of screws 143. A plate 144 is secured to the clamping member 142 by screws 145. The plate has an upwardly extending portion 146 supporting a lever 147 on a ball bearing pivot 148. The lever 147 has a head 149 at its forward end provided with a sloping surface 151 at the end. The bottom of the head 149 has a pivot 152 connected to a piston rod 153 of a ram 154 which is controlled by a solenoid valve 155. The carrier 36, as illustrated in FIGS. 6 and 7, has the operating arm 77 secured to an offset extension 156 by a screw 157 and dowel pins 158. The offset extension 156 has a roller 159 extending outwardly thereof in position to engage the sloping surface 151 of the lever 147 when the lever has been moved upwardly into the position of engagement therewith. The movement of the roller 159 upwardly moves the brake shoes 82 downwardly into engagement with the brake shoe engaging strip 43.

A pressure regulator and filter element 161 and 162 are mounted on the plate 144 for use in the fluid system of the ram 154 in the conventional manner. The use of this carrier stop mechanism provides a station at which work can be performed manually adjacent to a station which had become defective. In this manner, all of the operations will be performed in a required sequence to correctly assembly the subassembly parts. The transfer mechanism between the branch loops 31 and 32 moves the sub-assemblies from the branch loop 31 and assembles them with the sub-assemblies in the branch loop 32.

As illustrated in FIG. 2, each of the carriers has a channel element 163 mounted on the inner edge thereof for operating control elements such as valves, switches and the like as the carriers pass through the stations. It will be noted in FIG. 18 that a switch element 164 has a roller 165 on an actuating arm in engagement with a bottom side 166 of the element 163 while a roller 167 on an actuating arm of a switch 168 is in engagement with the top side 169 of the channel element. The channel element 163 is secured to the rearwardly extending legs 170 of the carrier 36 by screws 171. As illustrated in FIG. 17, the top side 169 of the channel element 163 engages the vertical side of an angle member 172 mounted on pivots 173 secured to brackets 174. As the carrier is advanced from the station, the angle member will be swung counterclockwise and operates an arm 175 of a valve or switch 176 which shuts down the station and prevents the delivery of a carrier thereinto. If the carrier passes from the station, the angle member 172 will swing clockwise after being disengaged by the channel element 163 which permits a following carrier to be moved into the station.

In a portion of the branch loop 32 where the sub-assemblies have an element secured thereto by injecting a plastic between the parts, hydraulic pressure is employed which is also used for advancing and retracting the shuttle bar 92. A rotatable element 177, as illustrated in FIG. 29, has a thread 178 of slow lead in which a roller 181 of a head 179 extends. When the element 177 is rotated by a fluid motor 180 and chain drive 190 in one direction and then in the other, the head 179 is moved on a pair of rods 170 and the shuttle bar 92 is advanced and retracted. The cycle of operations taking place at the station requires approximately five seconds while at the station where the element is secured by the injected plastic approximately eight seconds are required. Two stations are employed to perform the plastic operations simultaneously into which two carriers are advanced at the same time. At these stations the mechanism for rotating the shuttle bar is lacking and the rotational movement is obtained by the use of a pair of rams 182 and 187, as illustrated in FIG. 30. A sleeve 183 has a stop element 184 thereon which engages a wear plate 49 when the shuttle bar 92 is rotated counterclockwise by the retraction of the ram 182 to release the fingers 186 from between the wear plates 49 and permit the shuttle bar 92 to be retracted as illustrated in the Figure. The ram 182 is extended to rotate the sleeve 183 clockwise and move the finger 186 between the wear plates 49 and the stop element 184 therefrom when the carriers are to be advanced. Should the operation to be performed occur at a station which has become defective, the second ram 187 is actuated to operate a link 188 mounted on a fixed pivot 189 and connected by a pivot 191 to the bottom of the ram 182. When the ram 187 is extended, the pivot on the sleeve 183 is moved downwardly to the dotted line position 192 to rotate the shaft 92 counterclockwise and move the stop elements 184 and fingers 186 out from between the wear plates 49 to permit the carriers to pass through the station without being stopped thereat.

It will be noted that an operating element 193 actuates a switch 194 when the fingers 186 are disposed between the wear plates 49. The operating element 193 is in engagement with a switch 195 when the fingers 186 are moved from between the wear plates 49 and the stop element 184 is disposed therebetween. When the stop elements 184 and the fingers 186 are moved outwardly away from the wear plates 49, a switch 196 is actuated by the operating element 193. Valves and switches are employed throughout the system to control the movement of the carriers, stopping them at the stations with a positive braking operation which prevents damage and noise. The controls move the stop arms 85 into the path of advancement of the brake operating roller 159 of the carrier and releases the arm 85 thereafter so that the stopped carrier can be moved by the chain a short distance into engagement with the stop element 108 and placed under the control of the shuttle bar 92. The ram 203 moves the lever 200 to release the single revolution clutch 100 which drives the disc 97 and cam plate 111 one revolution. This reciprocates the shuttle bar 92 to move the carrier into the station as it advances a carrier therefrom. The shuttle bar is rotated to move the fingers 109 from between the wear plates 49 so that the shuttle bar can be retracted. It is to be understood that two of the carriers will be advanced into the two adjacent stations where the plastic operations are to be performed to secure the elements to the assemblies. Only one stop finger is employed to locate the first carrier in the station, the second carrier being stopped by the roller on the pin 84 at the rear of the stopped carrier. The fingers 109 will engage the wear plates 49 on the four carriers and advance them into and from the stations. The carriers are free to accumulate in the holding areas, one behind the other, since the brake operating lever will be actuated by the preceding carrier when the following carrier is advancing toward engagement therewith.

The chain 45 is continuously driven to advance the carriers 36 along the vertical track system 35 when free to advance and are stopped in the holding area ahead of the work performing stations by the arms 85. The following carrier when approaching the area occupied by the preceeding carrier will be stopped when the brake actuating arm 77 engages the roller on the pin 84 at the rear of the stopped carrier. When the foremost carrier is stopped in the holding area, a brake element switch (not shown) is operated which will produce a short delay to permit the carrier to be decelerated by the application of the brake shoes. Thereupon, the arm 85 is lowered to permit the carrier to be advanced a short distance by the chain 45 until its wear plate 49 engages the stopped element 108 and operates the positive stop limit switch (not shown).

Referring to FIGS. 14, 31, 32 and 33, a product qualification check is made on the sub-assemblies to ascertain whether a "good" operation was performed thereon at the prior station. A pair of proximity switches 204 located ahead of a pair of rollers 205 are aligned with leads 206 of flags 207 which are herein illustrated as rods shiftable lengthwise and provided with circumferential notches 208 and 209 adjacent the end opposite to that having the head 206. A spring pressed finger 210 extends into one or the other notches 208 and 209 for preventing the accidental displacement of the flags. A head 211 is provided on the end of the flages 207 having the notches 208 and 209 therein. The heads 206 will be located in aligned relation to the proximity switches 204 when the carrier is held ahead of the station by the stop element 108 and a reading will be had of each flag as to whether a "good" or "bad" operation has been performed on the two rotors at the prior station. If the flags are in "good" position, the positive stop limit switch will start the operation advancing the carrier into the station which movement passes the heads 206 of the flags 207 past the rollers 205 which moves them to the "bad" position. The stop switches produces the engagement of the clutches for the work performing arms and advances the locking slide 133 for the pallet which accurately locates and clamps it at the sation after the shuttle bar is advanced. At the end of the forward cycle, the fingers 109 will be moved out from between the wear plates of the carriers and the stop element 108 moved therebetween to retain the pallets in position as the shuttle bar is retracted. The locking up of the pallet and the advancement of the shuttle bar required approximately one second leaving four seconds available to simultaneously perform the operations on the two sub-assemblies in the station. If the operations performed are satisfactory, air will be introduced into reset cylinders 212 which are supported on a gib of the slide 133 to move the heads 213 outwardly into engagement with the heads 211 to move the flags 207 to "good" positions which will be recorded by the proximity switches 204 at the next station to which the carrier will be advanced. Should one or both of the arms perform a defective operation, the arm or arms will override the normal stop position and thereby actuate a switch to cut off the supply of air to the cylinders 212 and the heads 213 will remain retracted. In this case, the flag will not be advanced to the "good" position and will thereby record a "bad" position, that is to say, a defective operation. When three carriers have passed through a station where the proximity switches 204 have registered the defective operations, a signal will be given to inform an attendant that the station is defective and requires repair.

Figure 31:
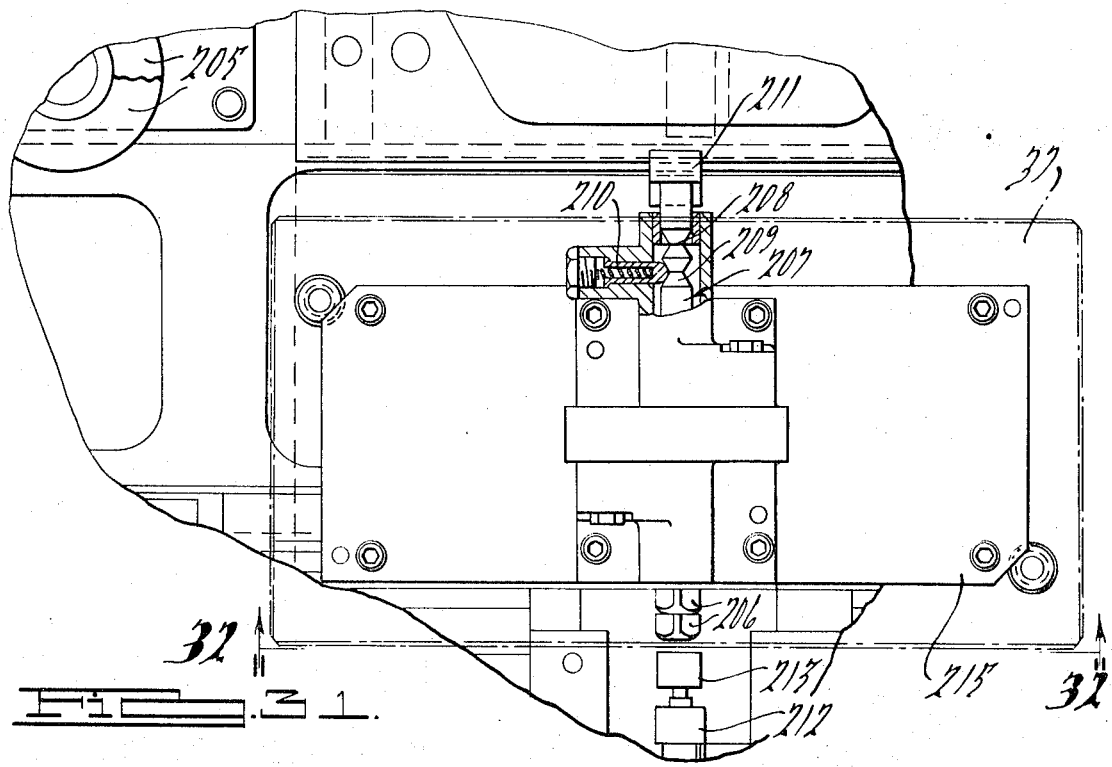
FIG. 31 is a broken enlarged view with parts in section of the structure illustrated in FIG. 14 with the flags, flag setters and flag readers in aligned relation.
Figure 32:
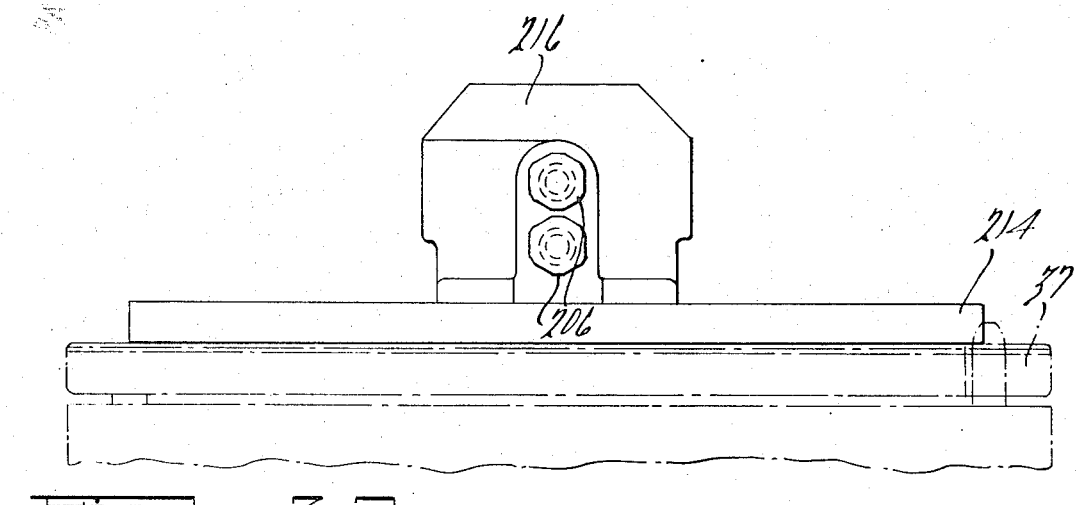
FIG. 32 is a side view of the structure illustrated in FIG. 31 as viewed from the point 32 thereof.
Figure 33:
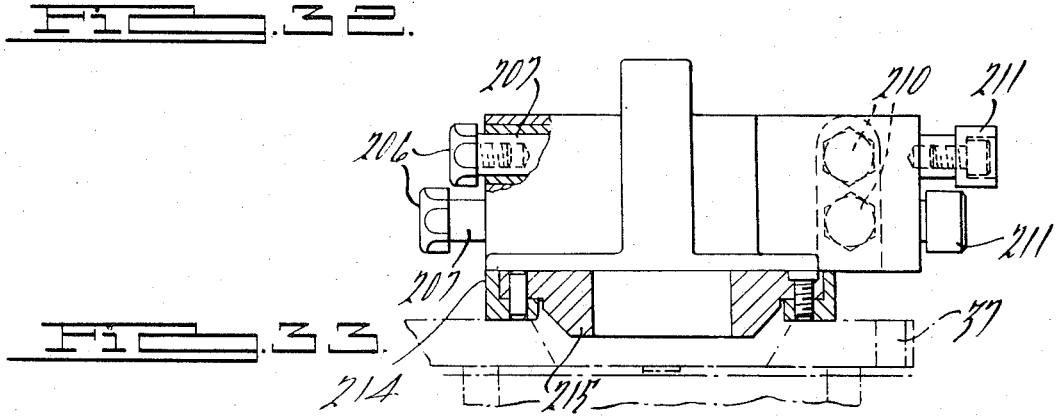
FIG. 33 is an end view of the structure illustrated in FIG. 31, with parts in section.

The pallet as illustrated in FIGS. 31, 32 and 33 supports a pair of rotors 38 which rests in a recess 214 in a plate 215 supported by the pallet 37. The central boss 216 of the plate 215 supports the flags 207 one above the other and the locking levers 217. The levers 217 are secured on pivots 218 and are provided with an end 219 which engages the rotor wall and secures the rotors in the recesses 24. A spring finger 222 engages a notch 223 in the levers 217 for retaining them in rotor located position. A flag 207 is provided for each rotor and if the operation on one rotor is "good" and the other "bad," the operation on the good rotor will continue indicating a "good" operation has been performed. When three indications are had that "bad" operations are being performed on the other rotors the warning indication is provided and the carriers are passed through the station by energizing the ram 123 which rotates the shuttle bar to the position shown in FIG. 28 which permits the carrier to pass through the station without any operations being performed thereon. The station will be immediately repaired or if time is required, the manual operated carrier stop mechanism shown on FIGS. 8, 9 and 10 will be employed ahead of the station so that defective operation can be manually performed. The overrun of the arm occurred because of the lack of a part which was to be inserted within the rotor so that the arm traveled an extra amount, the thickness of the part, which provided the indication. The failure of the arm to advance to a predetermined position, the passage of the arm beyond a position, the failure of a rotating workpiece to stop or any other type of movement or stopping of the work performing element can actuate a valve, switch, photoelectric cell or the like for interrupting the flow of air to the resetting cylinder 212 permitting the head 213 to remain retracted and disclose a "bad" operation at the station.

The drive for each station, as illustrated in FIG. 5, is through a slip clutch 220 which moves rollers 230 outwardly, due to the cone and socket engagement of the inner ends, to move a plate 231 outwardly against a plurality of springs 232 into engagement with an stops the motor 67 and prevents damage when an overload occurs. As illutrated in FIG. 5, the reduction unit 70 drives a shaft 238 having a double sprocket 239 thereon which drives a chain 241 and a pair of double sprockets 242 on a pair of shafts 243 which are driven in rotation. The shafts have cams thereon which operate arms upwardly and downwardly for raising parts and moving them downwardly relative to the sub-assemblies as the sub-assemblies are moved from one station to another.

Four flags are employed on the central bosses 216 of the branch loop 32, two for each workpiece to check one or two operations thereon performed at each station. The four flags are mounted one above the other so as to be advanced by the two rollers to "bad" positions and reset if "good" operations were performed by the two resetting air cylinders 212. The "good" or "bad" operations are checked by the two proximity switches 294 as above described.

In the first branch loop 31, two sub-assemblies are mounted on each pallet and advanced through the stations to have assembly work performed thereon until the parts are completely assembled by the time the pallet reaches the transfer station 33 between the loops. Here, both of the completed sub-assemblies are transferred to the second branch loop 32 where they are united with the sub-assemblies on a pallet of a carrier thereat to have assembly work performed thereon. The carriers are advanced from station to station to have assembly work performed thereon including the injection of plastic to secure the elements in fixed position and other necessary operations so that in end complete units have been assembled. Any elements on which assembly or machine operations are to be performed may be carried singlely or in multiple by the pallets on one or both branch loops.

The operation of the carriers on the tracks in each of the branch loops 31 and 32 is such as to have them stopped before they enter a station. A carrier is stopped ahead of a station by the arm 85 when raised upwardly and if the carrier is not immediately advanced other carriers advancing along the track will accumulate by being stopped through the engagement of the lever 77 with the roller on the pin 84 of the preceeding carrier. After a slight delay, the arm 85 drops down releasing the brake and permitting the carrier wear plate to engage the wear plates of the chain which advances the carrier against the stop element 108 at a position where the proximity switches 204 read the position of the flags 207 to ascertain whether the operations on the two sub-assemblies at the prior station were "good" or "bad." If the operations are "good," the single revolution clutch is released permitting the shuttle bar to be rotated to have the fingers 109 move between the wear plates 49 and the stop elements 108 to move therefrom to advance the carriers from and into the station. At the end of the shuttle bar advancement the pallet is locked up and the shuttle bar rotated to move the fingers 109 from and the stop element 108 between the wear plates 49 on the carriers so that the shuttle bar can be returned to its starting position and again rotated. The station clutches are actuated to start the work performing operation on each of the sub-assemblies being worked on. The lockup of the pallet is performed by the work operating drive element which also unlocks and lowers the pallet after the work operation is performed which required approximately four seconds. The application of switches, valves and the other elements produce the interlocking and sequential actuation of the elements to continue the advancement of the carriers and the operation of the mechanisms at the stations to perform the work seriatim thereon. This is also true for the reading of the proximity switches to ascertain the kind of operations which were performed so that the operations can continue or be intrrupted or have a manual stop element for the carriers secured ahead of the stations. All of these interlocking and sequential operating elements have not been disclosed in detail as anyone skilled in the art knowing the operations to be performed can set up the switches, valves and interlocking structures to produce the manipulation of the carriers and perform the work operations on the workpieces carried by the pallets.

We claim:

1. In a palletized machine, a track, a chain supported by said track having wear plates thereon, carriers on said track having a wear plate in engagement with the wear plates of said chain for advancing the carriers along the track as the chain moves thereon, brake means on said carriers, a brake strip on said track engageable by said brake means, and means on said carrier for moving said brake means against said brake strip when actuated for stopping said carrier and for raising its wear plate from the wear plates of the chain to eliminate wear therebetween.

2. In a palletized machine as recited in claim 1, wherein said brake means is actuated by a lever pivoted at the forward end of said carrier.

3. In a palletized machine as recited in claim 2, wherein an element on the rear of each carrier is in position to operate said brake lever when one carrier approaches a carrier thereahead.

4. In a palletized machine as recited in claim 3, wherein a pallet is mounted on each said carrier, and stations located along said track where operations are performed on workpieces supported on said pallets.

5. In a palletized machine as recited in claim 4, wherein a lever is mounted ahead of at least some of said stations, and means for moving said levers into and out of the path of the advancing brake lever of a carrier for stopping said carrier in an accumulating area ahead of said station.

6. In a palletized machine as recited in claim 1, wherein a shuttle bar is mounted at each said station, means for advancing and retracting said shuttle bar, and a stop element movable between the wear plates of adjacent carriers at the station and ahead thereof for retaining the carriers against advancement by said chain after the brake lever is released.

7. In a palletized machine as recited in claim 6, wherein fingers on said shuttle bar are disposed adjacent to said stop elements for movement between the adjacent wear plates of the carriers as the stop elements are moved therefrom to permit the shuttle bar to advance the carriers into and from the station.

8. In a palletized machine as recited in claim 7, wherein means are provided for detecting the presence of a carrier within the station and the absence of a carrier therein.

9. In a palletized machine as recited in claim 7, wherein a plurality of carriers are stopped ahead of the station and engaged by said stop fingers to be advanced simultaneously into a plurality of adjacent stations as the plurality of carriers therein are positively advanced therefrom.

10. In a palletized machine as recited in claim 6, wherein means are provided for moving the lever ahead of the station out of engagement with the brake lever to lower the wear plate of the carrier onto the wear plate of the chain which advances the carrier a very short distance into engagement with said stop element which is under the control of the shuttle bar.

11. In a palletized machine as recited in claim 7, wherein means are provided for moving the fingers and stop elements out of the path of engagement with the wear plates of the carriers to permit the carriers to continue through the station without being stopped.

12. In a palletized machine as recited in claim 1, wherein said carrier supporting track is vertically disposed and provided with a channel in which said chain is advanced, and plastic elements on each side of said channel on which the chain wear plates are supported and advanced.

13. In a palletized machine as recited in claim 12, wherein pallets are supported on top of the carriers, and pins extend upwardly from said carriers through fitted holes in said pallet for retaining the pallet against shift relative thereto.

14. In a palletized machine as recited in claim 13, wherein said pins are mounted in an elastomeric material to permit them to shift with the pallet when the latter is accurately located at a station.

15. In a palletized machine as recited in claim 14, wherein elastomeric material on the top of the carrier supports the pallet out of engagement with the metal thereof.

16. In a palletized machine as recited in claim 14, wherein the drive for operating the work performing elements at the station moves a spring pressed slide against one edge of the pallet to accurately locate the pallet and lock it in located position.

17. In a palletized machine, a track, carriers on said track, a plurality of stations along said track, means for advancing carriers along said track into said stations, a pallet on said carrier for supporting a workpiece to be operated on in a station, a work performing indicator on said pallet and carrier, a reader for said indicator located at a holding area ahead of a station, means actuated at the station for performing a work operation on the workpiece on the pallet, and means for retaining a carrier in said holding area so that the indicator can be read.

18. In a palletized machine as recited in claim 17, wherein said reading provides indications of "good" or "bad" operations performed at the station ahead of the one to which the carrier was advanced.

19. In a palletized machine as recited in claim 18, wherein said work performing indicator is an axially shiftable rod and wherein said reader is a proximity switch which indicates the longitudinal position of the rod.

20. In a palletized machine as recited in claim 19, wherein means are provided between said proximity switch and stations which is engaged by one end of the rod as the carrier moves thereby for shifting said rod to "bad" operation position, and resetting means at the station for moving the rod to "good" position if a good operation has been performed.

21. In a palletized machine as recited in claim 20, wherein said resetting means is an air cylinder, and a switch actuated at the prior station when a defective operation is performed thereat for preventing air to be supplied to the resetting air cylinder at the advanced station so that the longitudinal position of the rod showing a "bad" operation is retained.

22. In a palletized machine, a track, carriers on said track, a plurality of stations along said track, means for advancing carriers along said track into said stations, a pallet on said carrier for supporting a workpiece to be operated on in a station, drive means for the mechanism which performs work at the station, means locating and clamping the pallet at the station, and means driven by said drive means for operating said locating and clamping means.

23. In a palletized machine, a track, acarriers on said trakc, a plurality of stations along said track, means for advancing carriers along said track into said stations, a palleton said carrier for supporting a workpiece to be operated on in a station, an indicating means for indicating whether a "good" or "bad" operation was performed at the station, and means actuated when the indicator is "bad" for passing carriers through the station without any work being performed thereon.

24. In a palletized machine, as recited in claim 23, wherein an attachable carrier stop mechanism is securable to said track ahead of said station in position to stop carriers advanced on said track to have the operation indicated "bad" at the station performed manually at the attached stop mechanism until the defect at the station has been repaired.

25. In a palletized machine, a pair of loops formed by tracks, carriers on said tracks, a plurality of stations along said tracks, means for advancing carriers along said track into said stations, a pallet on said carrier for supporting a workpiece to be operated on in a station, means for performing assembly operations on workpieces in each loop as the carriers are passed from one station to another, and a transfer mechanism located between said pairs of loops for transferring an element from one loop which had the operations completed thereon and assembled in an element in the other loop.

26. In a palletized machine, a track, carriers on said track, a plurality of stations along said track, means for advancing carriers along said track into said stations, a pallet on said carrier for supporting a workpiece to be operated on in a station, drive means having a single revolution clutch, an overload clutch and a cam plate having a pair of cam tracks, means for releasing and engaging said single revolution clutch for advancing and retracting the shuttle bar, and means actuated by the track of said cam plate for rotating said shuttle bar to locate the finger and stop elements thereof relative to the carriers at each end of the reciprocating cycle of the shuttle bar.

27. In a palletized machine, a track, carriers on said track, a plurality of stations along said track, means for advancing said carriers along said track, a pallet on said carriers for supporting a workpiece to be operated on in a station, shuttle means for advancing the carriers a predetermined distance into a station where the work operation requires a predetermined minimum time for the single station operation, a second shuttle means for simultaneously advancing two carriers into two stations where two times the predetermined time for the work operation will be had so that all of the workpieces of the carriers can be worked upon and advanced within the period of said predetermined time.

28. In a palletized machine, a track, carriers on said track, a plurality of stations along said track, means for advancing said carriers along said track into said stations, a pallet on said carriers for supporting a workpiece to be operated on in a station, brake means on each said carrier disposed between the front and back face thereof, a first arm extending forwardly of the carrier between the front and back faces thereof to be operated by an element at the rear of a carrier located thereahead, a second arm extending outwardly from the front face of the carrier, and a lever located out of the path of advancement of the carrier and in the path of advancement of said second arm for producing the brake operation when engaged thereby.

* * * * *